(12) United States Patent
Tagami et al.

(10) Patent No.: US 10,321,014 B2
(45) Date of Patent: Jun. 11, 2019

(54) IMAGE READING APPARATUS AND IMAGE FORMING APPARATUS, COMPRISING AT LEAST A MODE RECEPTION AND A SELECTION OF AT LEAST A QUALITY FIRST MODE OR A SPEED FIRST MODE

(71) Applicant: KYOCERA Document Solutions Inc., Osaka (JP)

(72) Inventors: Yuya Tagami, Osaka (JP); Hiroyuki Harada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/754,441

(22) PCT Filed: Aug. 25, 2016

(86) PCT No.: PCT/JP2016/074768
§ 371 (c)(1),
(2) Date: Feb. 22, 2018

(87) PCT Pub. No.: WO2017/056799
PCT Pub. Date: Apr. 6, 2017

(65) Prior Publication Data
US 2018/0262644 A1    Sep. 13, 2018

(30) Foreign Application Priority Data

Sep. 29, 2015 (JP) ................. 2015-192110
Oct. 9, 2015 (JP) ................. 2015-201058
Nov. 27, 2015 (JP) ................. 2015-232397

(51) Int. Cl.
*H04N 1/393* (2006.01)
*G06T 3/60* (2006.01)
(Continued)

(52) U.S. Cl.
CPC ............. *H04N 1/3935* (2013.01); *G06T 3/60* (2013.01); *H04N 1/00779* (2013.01);
(Continued)

(58) Field of Classification Search
USPC ......... 358/1.1–3.29, 531, 532; 382/263–269, 382/274, 289–299
See application file for complete search history.

(56) References Cited

U.S. PATENT DOCUMENTS 7,327,900 B2    2/2008  Harada et al.
8,155,443 B2    4/2012  Fukunaga
(Continued)

FOREIGN PATENT DOCUMENTS

CN    101320426 A    12/2008
CN    102342086 A    2/2012
(Continued)

*Primary Examiner* — Marcellus J Augustin
(74) *Attorney, Agent, or Firm* — IP Business Solutions, LLC

(57) ABSTRACT

An image reading unit reads a source document image in 600 dpi, and a resolution conversion unit converts the resolution of the image to 75 dpi. An inclination detection unit detects inclination of the source document image. When a character conversion unit is to execute character recognition after cropping, a mode setting unit sets a quality-first mode. The inclination correction unit corrects the inclination of the image of 600 dpi, according to the inclination of the source document image detected by the inclination detection unit. A document image clipping unit clips out the source document image, and the resolution conversion unit converts the resolution of the source document image to 200 dpi. Thereafter, the character conversion unit executes the character recognition.

11 Claims, 19 Drawing Sheets

(51) Int. Cl.
  *H04N 1/04*    (2006.01)
  *H04N 1/00*    (2006.01)
  *G06T 1/00*    (2006.01)
  *H04N 1/387*   (2006.01)

(52) U.S. Cl.
  CPC .............. *H04N 1/04* (2013.01); *G06T 1/00* (2013.01); *H04N 1/00469* (2013.01); *H04N 1/387* (2013.01); *H04N 1/3878* (2013.01)

(56) References Cited

U.S. PATENT DOCUMENTS

| | | | |
|---|---|---|---|
| 8,199,357 B2* | 6/2012 | Miyagi | H04N 1/40062 |
| | | | 358/1.16 |
| 8,368,965 B2* | 2/2013 | Wang | H04N 1/3873 |
| | | | 358/1.18 |
| 2004/0264805 A1 | 12/2004 | Harada et al. | |
| 2007/0146810 A1* | 6/2007 | Kubo | H04N 5/23293 |
| | | | 358/448 |
| 2007/0170258 A1* | 7/2007 | Kagami | H04N 1/00994 |
| | | | 235/454 |
| 2009/0257658 A1 | 10/2009 | Fukunaga | |
| 2011/0299144 A1 | 12/2011 | Yoshimoto et al. | |

FOREIGN PATENT DOCUMENTS

| | | |
|---|---|---|
| JP | 2004-274198 A | 9/2004 |
| JP | 2005-057603 A | 3/2005 |
| JP | 2008-167009 A | 7/2008 |
| JP | 2009-252115 A | 10/2009 |

* cited by examiner

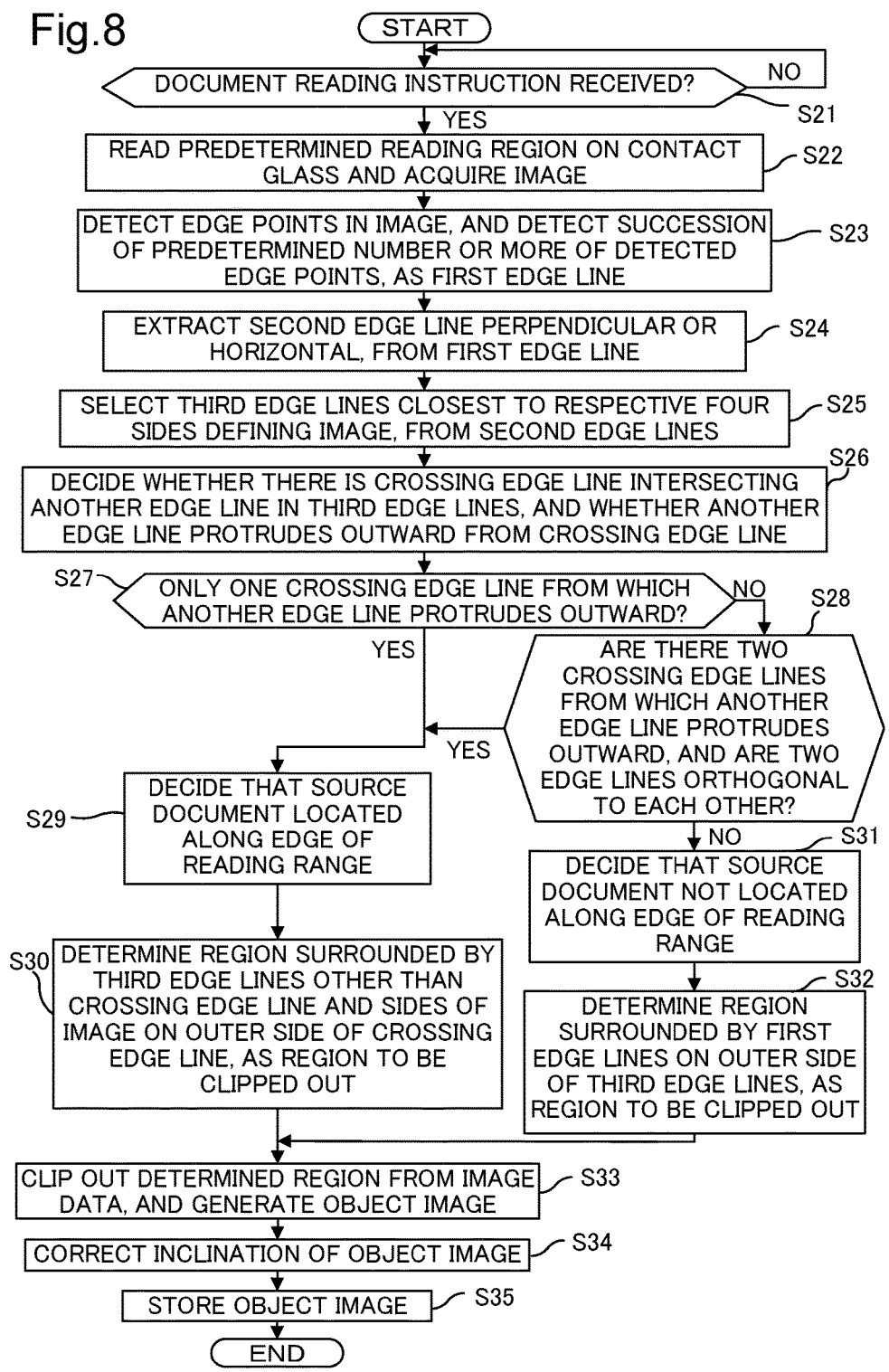

IMAGE READING APPARATUS AND IMAGE FORMING APPARATUS, COMPRISING AT LEAST A MODE RECEPTION AND A SELECTION OF AT LEAST A QUALITY FIRST MODE OR A SPEED FIRST MODE

TECHNICAL FIELD

The present invention relates to an image reading apparatus that reads a source document and acquires an image, and an image forming apparatus that prints the image.

BACKGROUND ART

Some of image reading apparatuses for reading an image of a source document have a function to automatically clip out only a source document image, from the image that has been read (automatic cropping). Generally, the automatic cropping function is configured to detect an inclination of the source document image when performing the cropping, when the source document placed on a document table is tilted, correct the inclination of the source document image clipped out, and display or store the corrected image. Patent Literature (PTL) 1 discloses a method of clipping out a source document image from an image read by an image reading apparatus, detecting an inclination of the source document image, and correcting the detected inclination of the source document image. In addition, PTL 2 discloses a method of clipping out an image from each of a plurality of source documents placed on a document table, detecting the inclination of each of the source document images, and correcting the detected inclination of the each of the source document images.

CITATION LIST

Patent Literature

[PTL 1] Japanese Unexamined Patent Application Publication No. 2004-274198
[PTL 2] Japanese Unexamined Patent Application Publication No. 2005-57603

SUMMARY OF INVENTION

Technical Problem

Many of the latest image reading apparatuses have a character conversion function (for example, optical character recognition (OCR)), for acquiring a source document image from a source document that has been read, identifying characters contained in the source document image, and converting the characters into character data that can be recognized by a computer or the like. In the case where the quality of the source document image is poor when the characters in the source document image are to be recognized with the OCR, the recognition accuracy is degraded. For example, when image processing, such as the character recognition (OCR), is performed after the inclination of the source document image is corrected on the basis of the acquired image of a reduced resolution, the image quality is degraded owing to the inclination correction, resulting in degraded accuracy of the character recognition. Accordingly, it is desirable to shorten the time for the inclination detection and also reduce the data amount, and yet minimize the degradation in quality of the source document image after the inclination correction. PTL 1 and PTL 2 make no reference to the case of correcting the inclination on the basis of the acquired image of a reduced resolution, and no reference to maintaining the image quality through the character recognition process.

The present invention has been accomplished in view of the foregoing situation, and provides a technique to shorten the time for the inclination detection and also reduce the data amount, and yet minimize the degradation in quality of the source document image after the inclination correction.

Solution to Problem

In an aspect, the present invention provides an image reading apparatus including an image reading unit that reads a source document in a predetermined resolution and acquires an image, a first resolution conversion unit that converts the resolution of the image acquired by the image reading unit into a first resolution for inclination detection lower than the predetermined resolution, an inclination detection unit that detects the inclination of an image of the source document contained in the image subjected to the resolution conversion by the first resolution conversion unit, an inclination correction unit that corrects the inclination of the image according to the inclination detected by the inclination detection unit, a document image clipping unit that clips out the image of the source document from the image, a second resolution conversion unit that converts the resolution of the image into a second resolution for generating a read image lower than the predetermined resolution and higher than the first resolution, and a mode setting unit that sets a quality-first mode or a speed-first mode. When the mode setting unit sets the quality-first mode, the document image clipping unit clips out, after the inclination correction unit corrects the inclination of the image acquired by the image reading unit in the predetermined resolution, according to the inclination detected by the inclination detection unit, the image of the source document from the image subjected to the inclination correction, and the second resolution conversion unit converts the resolution of the image of the source document into the second resolution. When the mode setting unit sets the speed-first mode, the second resolution conversion unit converts, after the document image clipping unit clips out the image of the source document from the image acquired by the image reading unit in the predetermined resolution, the resolution of the image of the source document that has been clipped out into the second resolution, and the inclination correction unit corrects the inclination of the image of the source document subjected to the resolution conversion into the second resolution, according to the inclination detected by the inclination detection unit.

In another aspect, the present invention provides an image forming apparatus including the foregoing image reading apparatus, and an image forming unit that prints an image read by the image reading apparatus, on a sheet.

Advantageous Effects of Invention

The foregoing configuration shortens the time for the inclination detection to be shortened and also reduces the data amount, and yet minimizes the degradation in quality of the source document image after the inclination correction.

BRIEF DESCRIPTION OF DRAWINGS

FIG. 8 is a flowchart showing a clipping process of image data, performed by the image reading apparatus according to the embodiment 2.

DESCRIPTION OF EMBODIMENTS

Hereafter, an image reading apparatus and an image forming apparatus according to embodiments of the present invention will be described in detail, with reference to the drawings. In the embodiments, the image reading apparatus will be taken up as example, for simplifying the description. The image forming apparatus according to the present invention can be obtained by combining an electrophotographic image forming apparatus, an ink jet printing apparatus or the like, with the image reading apparatus described hereunder.

Embodiment 1

Figure 1:
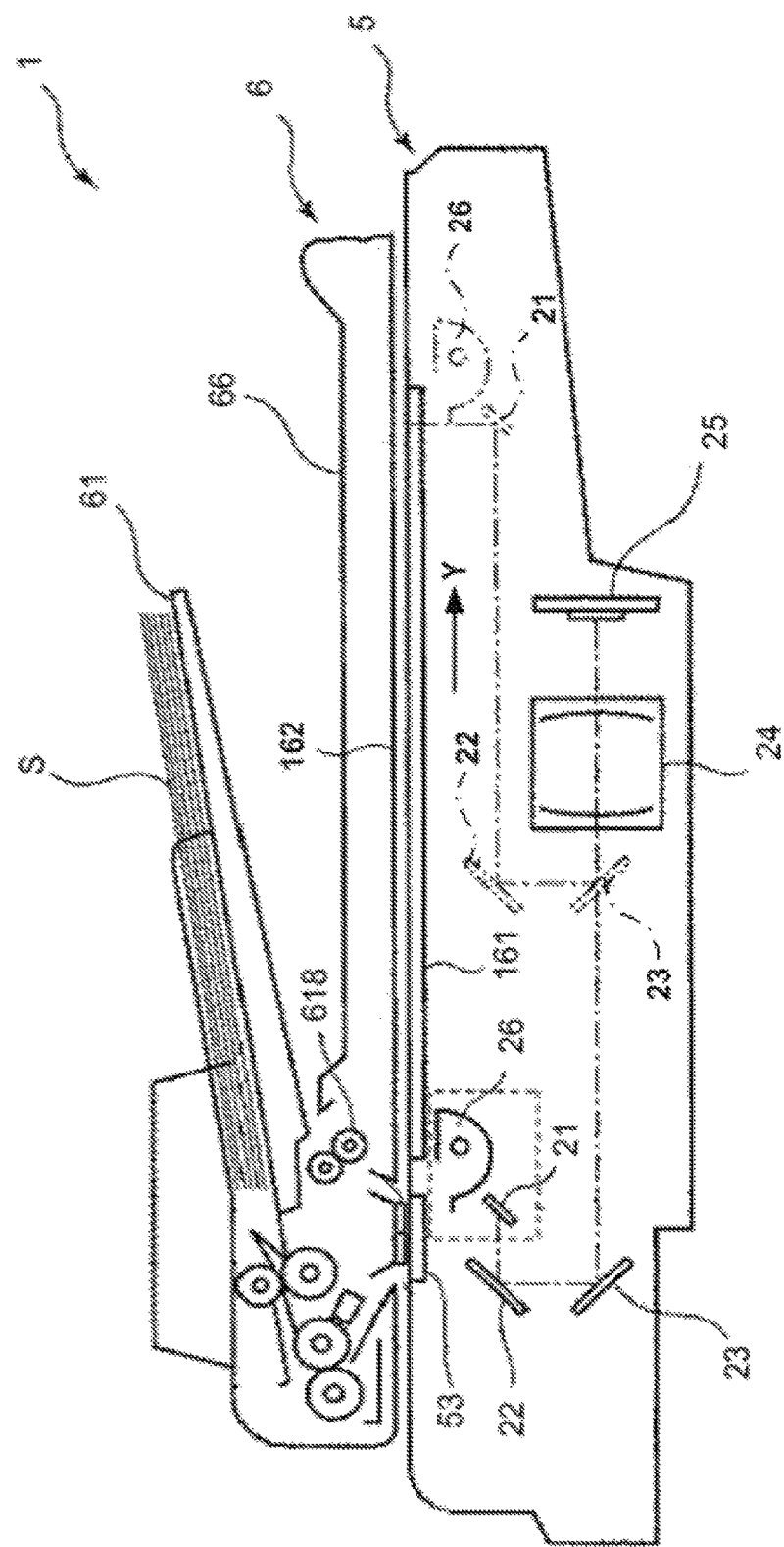
FIG. 1 is a schematic drawing showing an internal configuration of an image reading apparatus according to the present invention.

FIG. 1 is a schematic cross-sectional view showing a general configuration of the image reading apparatus 1. Although the image reading apparatus 1 shown in FIG. 1 includes a document feeding unit 6, configured as an automatic document feeder (ADF), the document feeding unit 6 may be omitted. The image reading apparatus 1 includes an image reading unit 5 and the document feeding unit 6.

The image reading unit 5 includes a contact glass 161 provided on the upper face, for a source document to be placed thereon, a light source 26 that emits light to the source document placed on the contact glass 161, a first mirror 21 that reflects the reflected light from the source document toward a second mirror 22, a third mirror 23 and a lens system 24 that conduct the reflected light to an image pickup device 25 constituted of an image sensor such as a charge coupled device (CCD) or a complementary metal oxide semiconductor (CMOS), and a document reading slit 53.

The document feeding unit 6 drives a feed roller and a transport roller, to pick up the documents one by one from a document stack S placed on a document setting section 61, transport the document to the position opposing the document reading slit 53 so as to allow the image reading unit 5 to read the document through the document reading slit 53, and discharge the document to a document discharge section 66.

Figure 2:
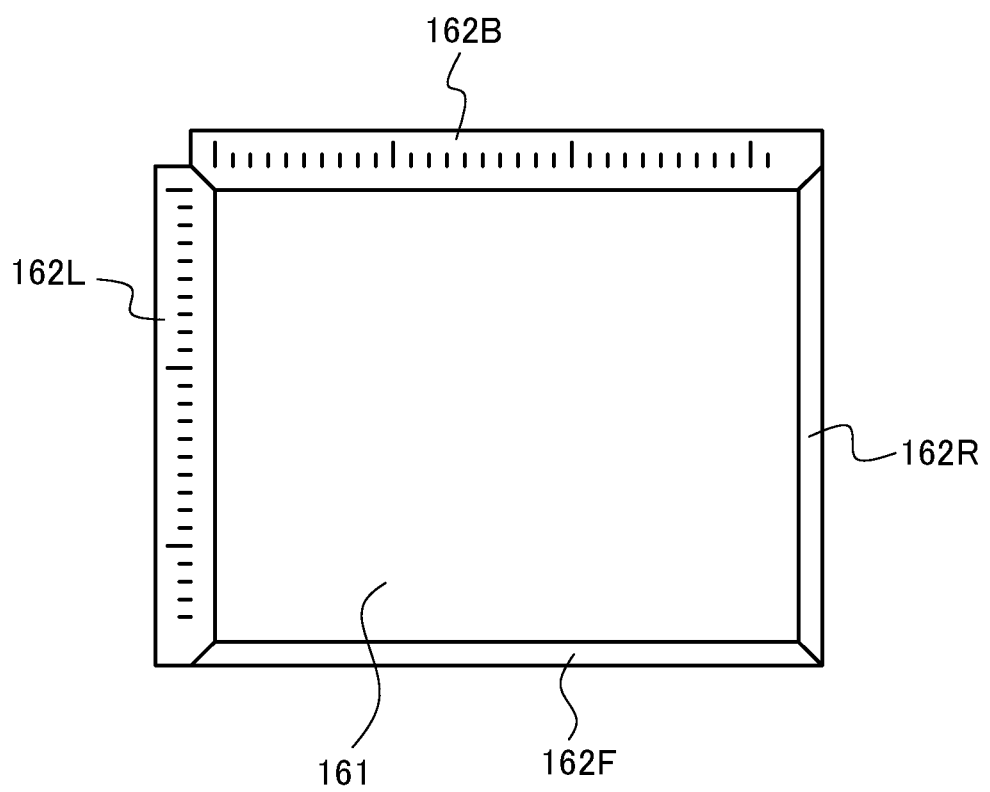
FIG. 2 is a schematic plan view showing a document table.

FIG. 2 is a schematic plan view showing the contact glass 161 (document table). The contact glass 161 is used to place the source document to be read, and document guides 162F, 162L, 162B, and 162R are located along the respective sides of the contact glass 161.

The document guides 162L, 162B respectively located on the left side and the far side include a scale for measuring the size of the source document, so that an operator can utilize the scale as reference when placing the source document on the contact glass 161.

The document feeding unit 6 also includes a document cover 162 that opens and closes the contact glass 161 on the upper face of the image reading unit 5, and is opposed to the upper surface of the contact glass 161 when the document feeding unit 6 is closed.

When the user places the source document on the contact glass 161, and presses a start button (not shown) upon closing the document feeding unit 6, the light source 26 emits light under control of a controller 100 to be subsequently described, and the light from the light source 26 is transmitted through the contact glass 161 and illuminates the source document. As a result, the light reflected by the source document is incident upon the first mirror 21 through the contact glass 161. Such incident light is reflected by the second mirror 22, third mirror 23 and enters the image pickup device 25 through the lens system 24.

The image pickup device 25, which acts under control of the controller 100, converts the received light into an electrical signal. A plurality of the image pickup devices 25 are aligned in a main scanning direction, to acquire an output value corresponding to one line in the main scanning direction.

Further, the light source 26, the first mirror 21, the second mirror 22, and the third mirror 23 are driven by a drive unit such as a motor (not shown), so as to move in a sub scanning direction (indicated by an arrow Y), at a constant speed. Thus, the image reading unit 5 successively acquires, in the sub scanning direction, the output values corresponding to one line of the source document in the main scanning direction, and consequently reads the overall image of the source document.

Figure 3:
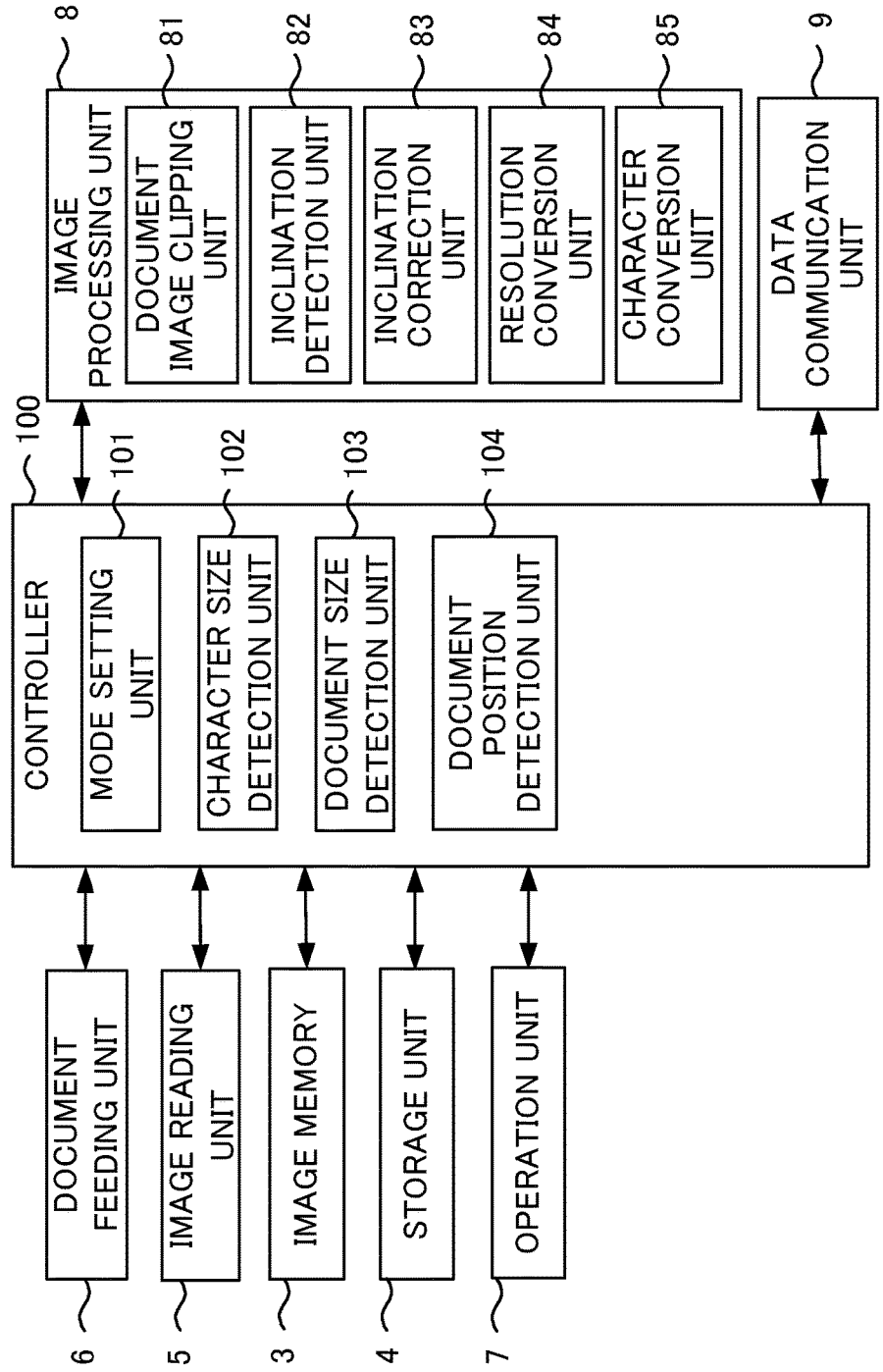
FIG. 3 is a functional block diagram showing an essential internal configuration of an image reading apparatus according to an embodiment 1.

FIG. 3 is a functional block diagram showing an essential internal configuration of the image reading apparatus 1. The image reading apparatus 1 includes the controller 100, the document feeding unit 6, the image reading unit 5, an image memory 3, a storage unit 4, an operation unit 7, an image processing unit 8, and a data communication unit 9. The elements same as those shown in FIG. 1 are given the same numeral, and the description thereof will not be repeated.

The image memory 3 temporarily stores the data read by the image reading unit 5 and data received by the data communication unit 9 from an external device. The storage unit 4 stores programs and data necessary for the operation of the image reading apparatus 1.

The operation unit 7 receives instructions of the user for operations and processings that the image reading apparatus 1 is configured to execute. For example, the operation unit 7 includes hard keys such as a ten key, a start button for executing or stopping operations, and a reset button, and a display screen constituted of a liquid crystal display (LCD) or the like. The display screen is for displaying operation methods, messages, and operation buttons. Normally the display screen is integrated with a touch panel, so that the user can operate the image reading apparatus 1 by touching the operation button displayed on the display screen. Here, the operation unit 7 according to this embodiment corresponds to the mode reception unit in the present invention.

The image processing unit 8 performs image processing with respect to the print data stored in the image memory 3, such as clipping out (cropping) of a source document image, detection and correction of inclination of the image, resolution conversion, character conversion, picture quality adjustment, and scaling up and down. The image processing unit 8 includes a document image clipping unit 81, an inclination detection unit 82, an inclination correction unit 83, a resolution conversion unit 84, and a character conversion unit 85.

The document image clipping unit 81 clips out an image in a region corresponding to a source document image, from the image read by the image reading unit 5. More specifically, the document image clipping unit 81 performs Hough transform with respect to the image read by the image reading unit 5, to thereby detect edge positions in the image. The document image clipping unit 81 then identifies peripheral edges of the source document on the basis of the edge positions detected, and determines a region surrounded by the peripheral edges as the region to be clipped out from the image data. The inclination detection unit 82 detects an inclination of the source document image contained in the image read by the image reading unit 5.

The inclination correction unit 83 corrects the inclination of the image, according to the inclination detected by the inclination detection unit 82 (rotation). The resolution conversion unit 84 converts the resolution of the image read by the image reading unit 5 into a predetermined resolution, and corresponds to the first resolution conversion unit and the second resolution conversion unit in the present invention.

The character conversion unit 85 identifies characters contained in the source document image, and converts the characters into character data that a computer can recognize. The character conversion unit 85 performs the character data conversion, for example using an OCR function. The document position detection unit 104 detects the position of the source document, on the basis of the source document image converted into a first resolution.

The data communication unit 9 includes a coding/decoding unit, a modem, and a network control unit (NCU), which are not shown, to perform facsimile transmission through the public telephone network. The data communication unit 9 also includes a network interface, to perform data transmission and reception to and from an external device such as a personal computer on the internet or in a local area, through a LAN connected to the data communication unit 9.

The controller 100 includes a central processing unit (CPU), a RAM, a ROM, and an exclusive hardware circuit, and controls the overall operation of the image reading apparatus 1. The controller 100 includes a mode setting unit 101, a character size detection unit 102, and a document size detection unit 103.

The mode setting unit 101 sets one of a quality-first mode, in which the resolution is converted after the inclination of the image read by the image reading unit 5 is corrected, and a speed-first mode The character size detection unit 102 detects the size of the character contained in the image read by the image reading unit 5. In this embodiment, the character size detection unit 102 detects the character size on the basis of the source document image converted into the first resolution. Except for the case of detecting the character size on the basis of the source document image converted into the first resolution, the character size detection unit 102 detects the character size by a known method.

The document size detection unit 103 detects the size of the image read by the image reading unit 5. The document size detection unit 103 detects the image size by a known method.

When acquiring a read image by processing the image read by the image reading unit 5, first the image reading unit 5 reads the image in the predetermined resolution, and reduces the resolution of the image to the predetermined second resolution before the image processing. The image reading unit 5 then processes the image of the second resolution, and provides the image subjected to the processing as the read image. It is for the purpose of reducing the data amount of the read image, that the resolution of the image is reduced to the second resolution. For example, the image reading unit 5 may read the source document in the predetermined resolution, for instance 600 dpi, and the resolution conversion unit 84 may reduce the resolution to the second resolution, for instance 200 dpi, before the image processing. In such a case, when the inclination correction unit 83 further corrects the inclination, the picture quality obtained after the processing differs depending on the order of the resolution conversion and the inclination correction.

To be more detailed, between a case (1) where the inclination correction unit 83 corrects the inclination of the image of 600 dpi, and then the resolution conversion unit 84 reduces the resolution of the image to 200 dpi, and a case (2) where the resolution conversion unit 84 reduces the resolution of the image of 600 dpi to 200 dpi, and then the inclination correction unit 83 corrects the inclination of the image, the case (1) more effectively minimizes degradation of the picture quality compared with the case (2). This is because correcting the inclination of the image of 600 dpi, which contains a larger amount of image information, incurs a smaller loss of data, after the inclination correction.

In contrast, correcting the inclination of the image of 200 dpi consumes a smaller amount of memory and requires a shorter time than correcting the inclination of the image of 600 dpi, because a smaller amount of image information is handled. Thus, the case (2) more effectively reduces the memory consumption and processing time, compared with the case (1).

Accordingly, the mode setting unit 101 sets either of the speed-first mode based on the case (2), and the quality-first mode based on the case (1), depending on the conditions described hereunder.

For example, when the character conversion unit 85 recognizes the characters in the image after the image read by the image reading unit 5 is subjected to the resolution conversion and the inclination correction, the image of lower quality leads to degraded recognition accuracy, hence to degraded reliability of the image reading apparatus 1. Therefore, when the character conversion unit 85 is to perform the character recognition, the mode setting unit 101 sets the quality-first mode.

In addition, when the characters contained in the image are smaller than a predetermined value, the mode setting unit 101 sets the quality-first mode, to prevent degradation in picture quality such that the characters are unidentifiably deformed, through the inclination correction performed after the resolution conversion.

When the size of the image read by the image reading unit 5 is equal to or larger than a predetermined value, the mode setting unit 101 sets the speed-first mode to reduce the processing time.

Further, the user may optionally select one of the speed-first mode and the quality-first mode, by operating the operation unit 7. The mode setting unit 101 sets the speed-first mode or the quality-first mode, according to the input made through the operation unit 7.

Figure 4:
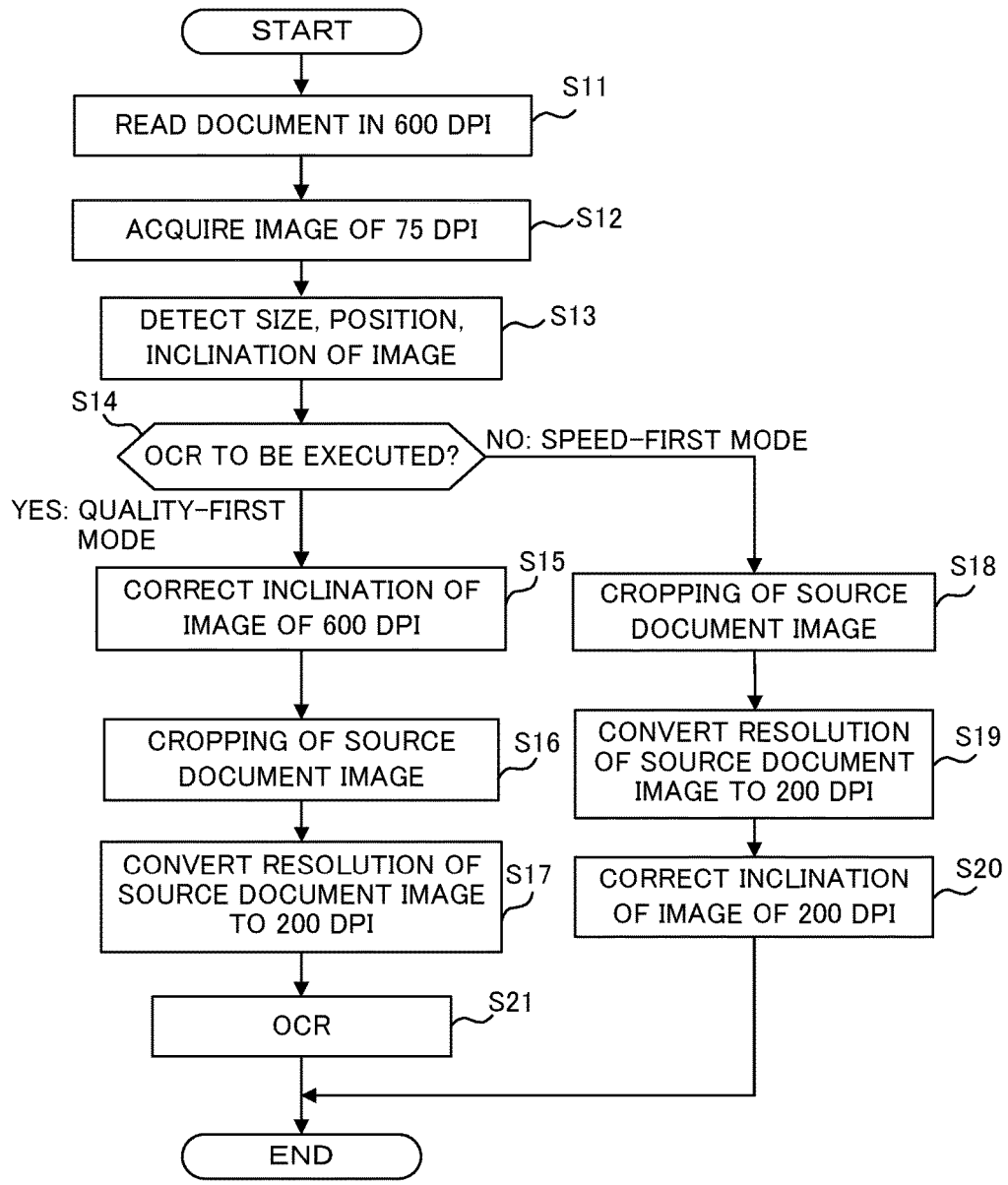
FIG. 4 is a flowchart showing a cropping process performed by the image reading apparatus according to the embodiment 1.
Figure 5:
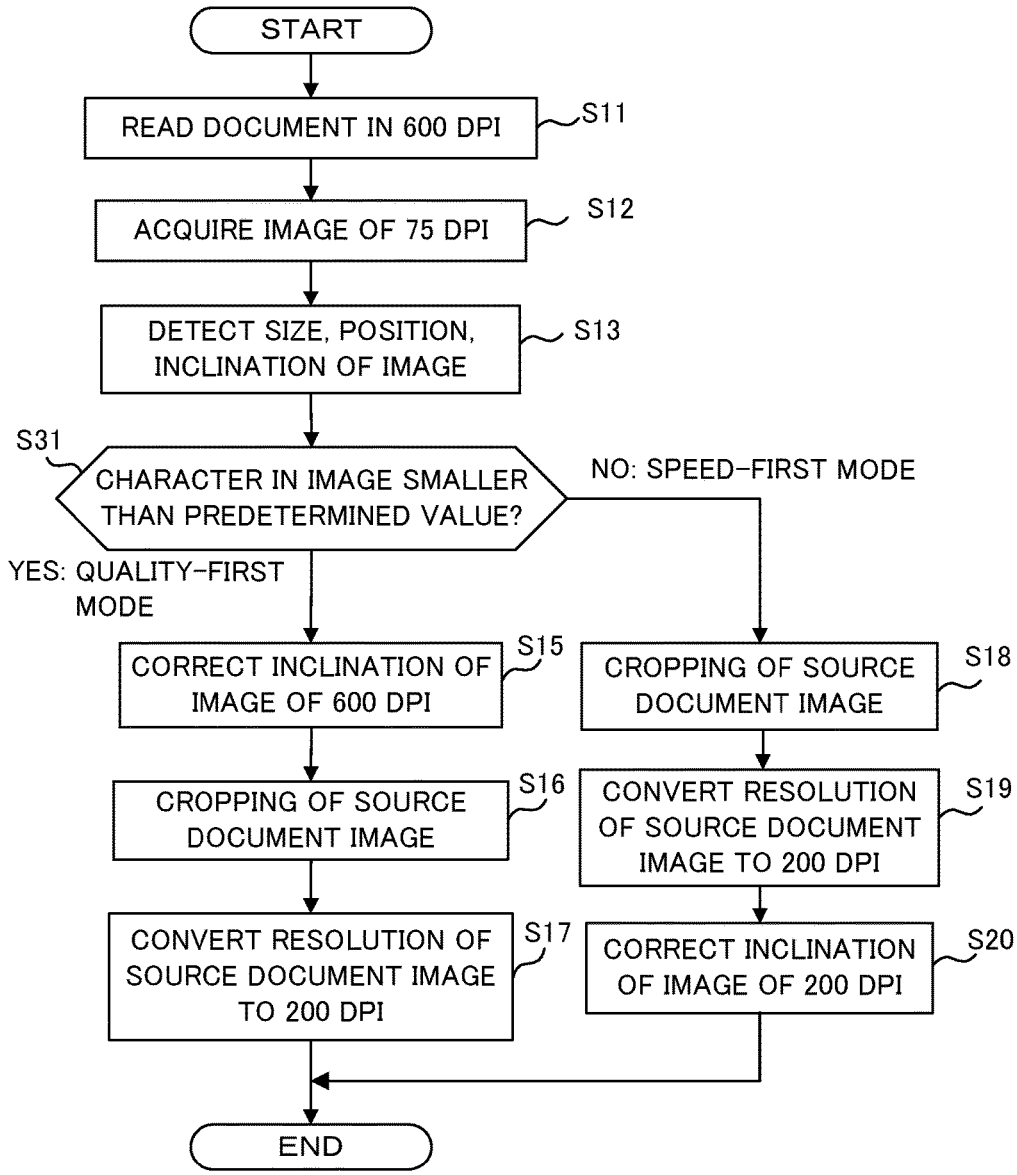
FIG. 5 is a flowchart showing another cropping process performed by the image reading apparatus according to the embodiment 1.
Figure 6:
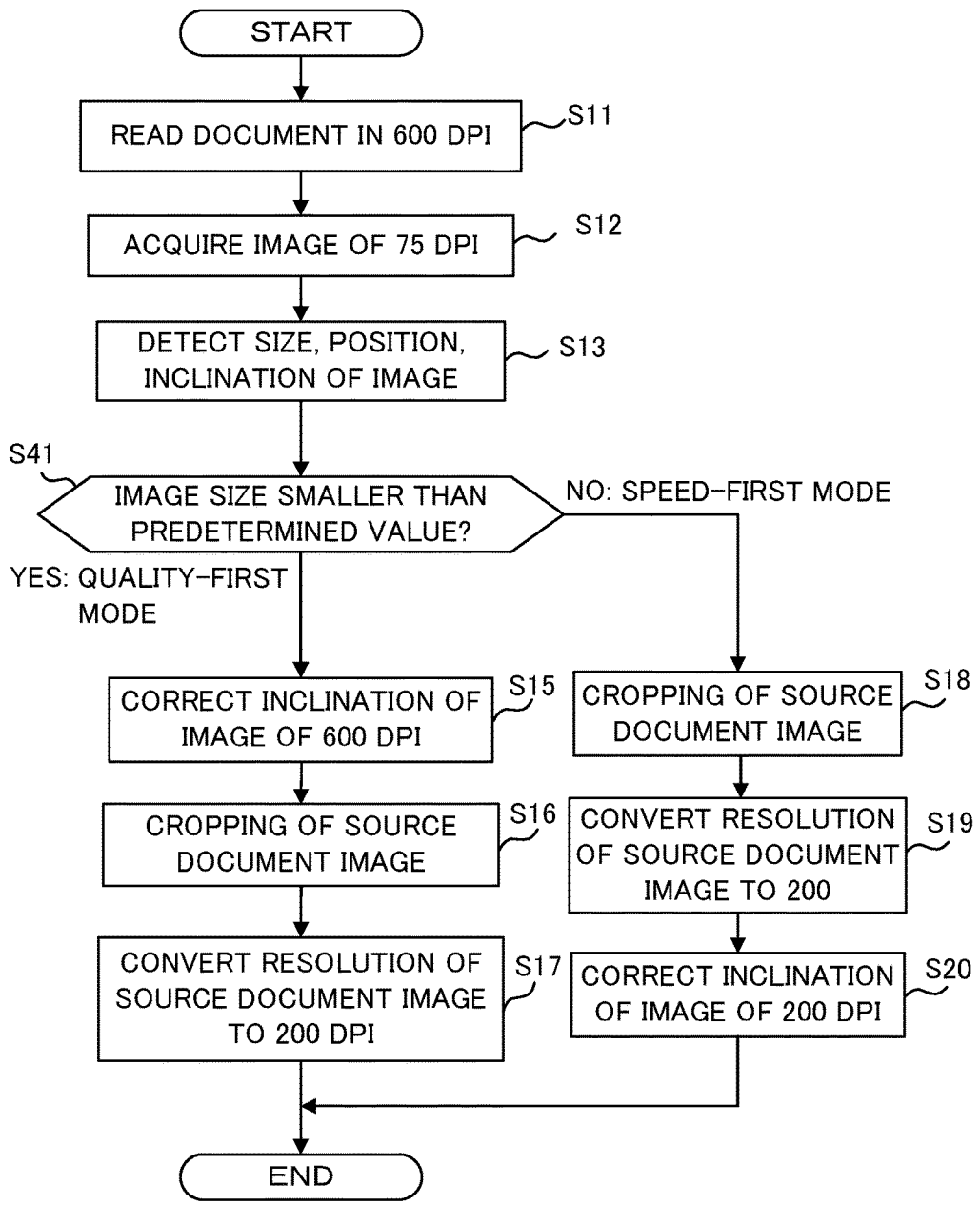
FIG. 6 is a flowchart showing still another cropping process performed by the image reading apparatus according to the embodiment 1.

FIG. 4 to FIG. 6 are flowcharts each showing the steps of the cropping process, and representing different conditions under which the mode setting unit 101 sets the quality-first mode or the speed-first mode. FIG. 4 represents the case where the mode setting unit 101 determines the mode depending on whether the character recognition is to be performed after the cropping.

First, the image reading unit 5 reads the source document image in the predetermined resolution, for example 600 dpi (step S11), and the resolution conversion unit 84 converts the resolution of the image to the first resolution lower than 600 dpi (e.g., 75 dpi), for detecting image information such as inclination (step S12). A reason for reducing the resolution is that it takes a shorter time to detect the position, the size, and the inclination of the source document image from the image read by the image reading unit 5.

Then the inclination detection unit 82 detects the inclination of the source document image, on the basis of the image of 75 dpi (step S13). At step S13, the document size detection unit 103 and the document position detection unit 104 also detect the size and the position of the source document image respectively, on the basis of the image of 75 dpi, and holds the detected data.

In the case where the character conversion unit 85 is to perform the character recognition (OCR) after the cropping (YES at step S14), the mode setting unit 101 sets the quality-first mode, and proceeds with the operation according to the case (1). More specifically, the inclination correction unit 83 corrects the inclination of the image of 600 dpi read at step S11, according to the inclination of the source document image detected by the inclination detection unit 82 (step S15).

Then the document image clipping unit 81 clips out the source document image from the image subjected to the inclination correction at step S15 (step S16), and the resolution conversion unit 84 converts the resolution of the source document image to the second resolution lower than 600 dpi (e.g., 200 dpi) (step S17). The character conversion unit 85 then performs the character recognition (step S21), and the operation is finished.

In contrast, in the case where the character conversion unit 85 is not to perform the OCR after the cropping (NO at step S14), the mode setting unit 101 sets the speed-first mode, and proceeds with the operation according to the case (2). More specifically, the document image clipping unit 81 clips out the source document image from the image of 600 dpi read at step S11 (step S18).

Then the resolution conversion unit 84 converts the resolution of the image clipped out at step S18 to the second resolution lower than the predetermined resolution of 600 dpi and higher than the first resolution of 75 dpi (e.g., 200 dpi), for generating the read image, and the inclination correction unit 83 corrects the inclination of the image, according to the inclination of the source document image detected by the inclination detection unit 82 (step S20). At this point, the operation is finished.

FIG. 5 represents the case where the mode setting unit 101 determines the mode depending on the size of the characters contained in the image. The steps of the same numeral as those of FIG. 4 represent the same process, and hence the description thereof will not be repeated.

At step S31, the character size detection unit 102 detects the size of the characters contained in the image, and the mode setting unit 101 sets the quality-first mode when the character size is smaller than a predetermined value, and the speed-first mode when the character size is equal to or larger than the predetermined value.

FIG. 6 represents the case where the mode setting unit 101 determines the mode depending on the size of the image read by the image reading unit 5. The steps of the same numeral as those of FIG. 4 represent the same process, and hence the description thereof will not be repeated.

At step S41, the document size detection unit 103 detects the size of the image read by the image reading unit 5, and the mode setting unit 101 sets the quality-first mode when the image size is smaller than a predetermined value, and the speed-first mode when the image size is equal to or larger than the predetermined value.

Although the mode selection by the mode setting unit 101 has been described above with respect to each of the conditions, the mode may be determined on the basis of a combination of a plurality of conditions.

As described above, the image reading apparatus according to the embodiment 1 minimizes the degradation in picture quality because, after the inclination correction unit 83 corrects the inclination of the image read by the image reading unit 5, the resolution conversion unit 84 reduces the resolution of the image to the second resolution. Such an arrangement also prevents a decline in character recognition rate, when the character recognition is performed. In contrast, in the case where the inclination correction unit 83 corrects the inclination of the image read by the image reading unit 5 after the resolution conversion unit 84 reduces the resolution of the image to the second resolution, the memory consumption for the inclination correction, as well as the processing time, can be reduced.

Further, after the resolution conversion unit 84 converts the resolution of the image of the predetermined resolution read by the image reading unit 5 into the first resolution for detecting the inclination, the position, the size, and the inclination of the source document image are detected on the basis of the image subjected to the resolution conversion. Therefore, the time required for such detection can be shortened.

Embodiment 2

Figure 7:
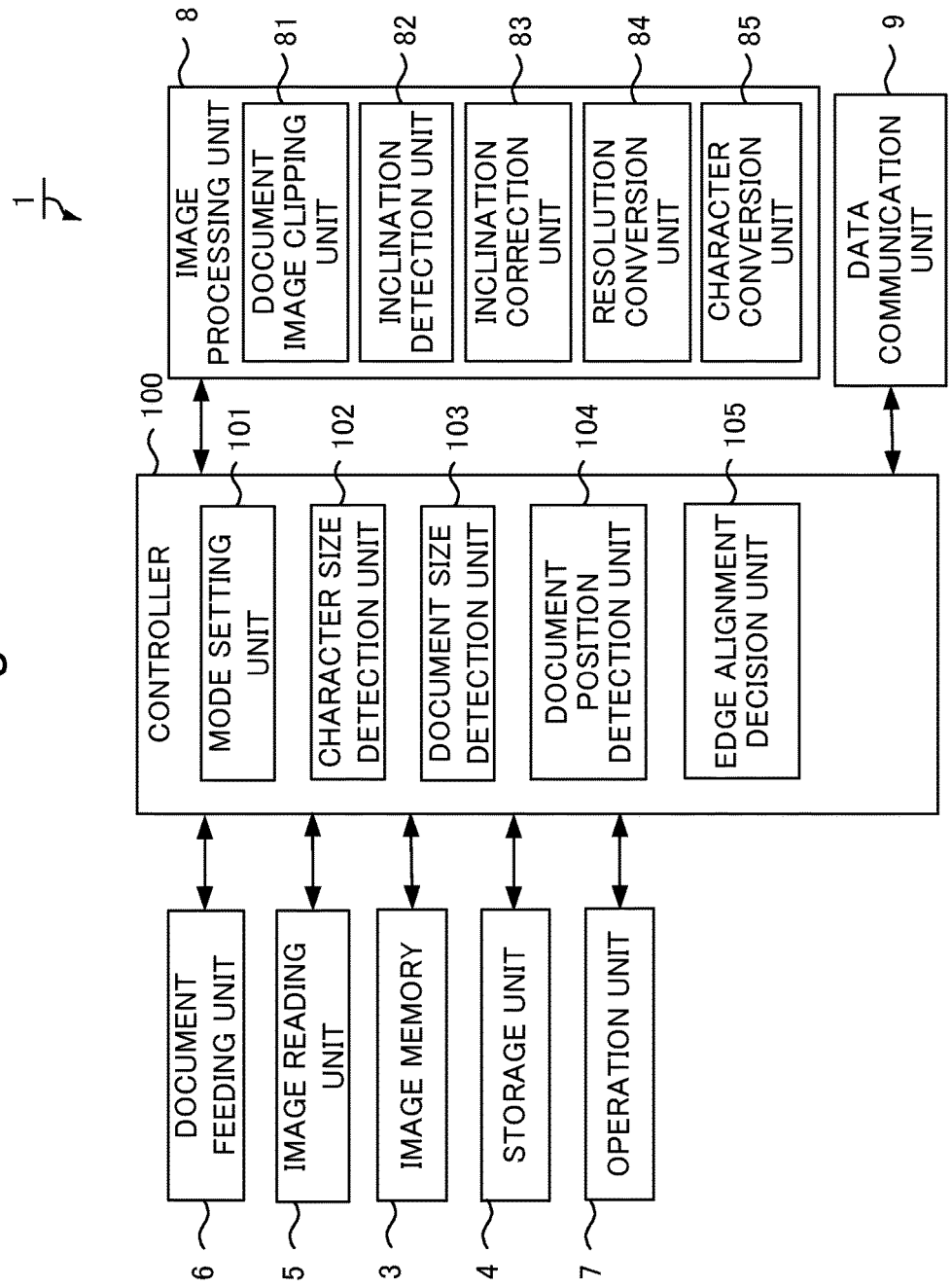
FIG. 7 is a functional block diagram showing an essential internal configuration of an image reading apparatus according to an embodiment 2.

FIG. 7 is a functional block diagram showing an essential internal configuration of an image reading apparatus according to an embodiment 2. The same elements as those of the image reading apparatus according to the embodiment 1 shown in FIG. 3 are given the same numeral, and the description thereof will not be repeated.

As shown in FIG. 7, the image reading apparatus according to the embodiment 2 includes an edge alignment decision unit 105, as an additional unit in the controller 100. The edge alignment decision unit 105 is configured to decide whether the source document is located along the edge of the reading range on the contact glass 161, when the image reading unit 5 is to read the image.

Now, when the source document to be read is located along the edge of a predetermined reading range on the contact glass 161, the edge position in the image data may fail to be properly detected by Hough transform. For example, when the source document is placed on the contact glass 161 in contact with at least one of the upper side, the lower side, the left side, and the right side of the contact glass 161, a peripheral edge of the source document in contact with one of the sides of the contact glass 161 may fail to be detected, by the detection based on the Hough transform. To avoid such a case, in the image reading apparatus according to the embodiment 2, the edge alignment decision unit 105 decides whether the source document is located along the edge of the reading range on the contact glass 161. The document image clipping unit 81 determines the region to be clipped out from the image data, according to the decision of the edge alignment, made by the edge alignment decision unit 105.

Hereunder, details of the edge alignment decision made by the edge alignment decision unit 105, and the clipping of the image data by the document image clipping unit 81, in other words the details of the operation at step S16 and step S18 of the embodiment 1, will be described mainly referring to FIG. 8, and also to FIG. 9A to FIG. 11H, where appropriate.

FIG. 8 is a flowchart showing an image reading process performed by the image reading apparatus 1. Upon receipt of an image reading instruction, to the effect that the image reading has to be performed (YES at step S21), the image reading unit 5 reads the predetermined reading range on the contact glass 161, thereby acquiring the image, under the control of the controller 100 (step S22).

Then the edge alignment decision unit 105 performs an image analysis such as Hough transform, with respect to the image acquired at step S22, to thereby detect edge points in the image, and further a succession of a predetermined number or more of the detected edge points, as a first edge line (step S23).

After step S23, the edge alignment decision unit 105 extracts, as a second edge line, an edge line in the first edge line that is perpendicular or horizontal to the four sides defining the image data (step S24).

Here, the edge alignment decision unit 105 extracts, not only the edge line that is strictly perpendicular or horizontal to the four sides defining the image, but also the edge line deviated within a predetermined angle from the line perpendicular or horizontal to the four sides, as the second edge line. Upon extracting such an edge line, the edge alignment decision unit 105 rotates the extracted edge line by the angle deviated from the line that is perpendicular or horizontal, and adopts the rotated edge line as the second edge line.

After step S24, the edge alignment decision unit 105 selects, as third edge lines, the edge lines in the second edge line that are closest to the respective four sides defining the image (step S25). At step S25, in other words, the second edge lines that are most distant from the center of the image, in the direction toward the upper side, the lower side, the left side, and the right side of the image respectively, are selected as the third edge line.

Figure 9A:
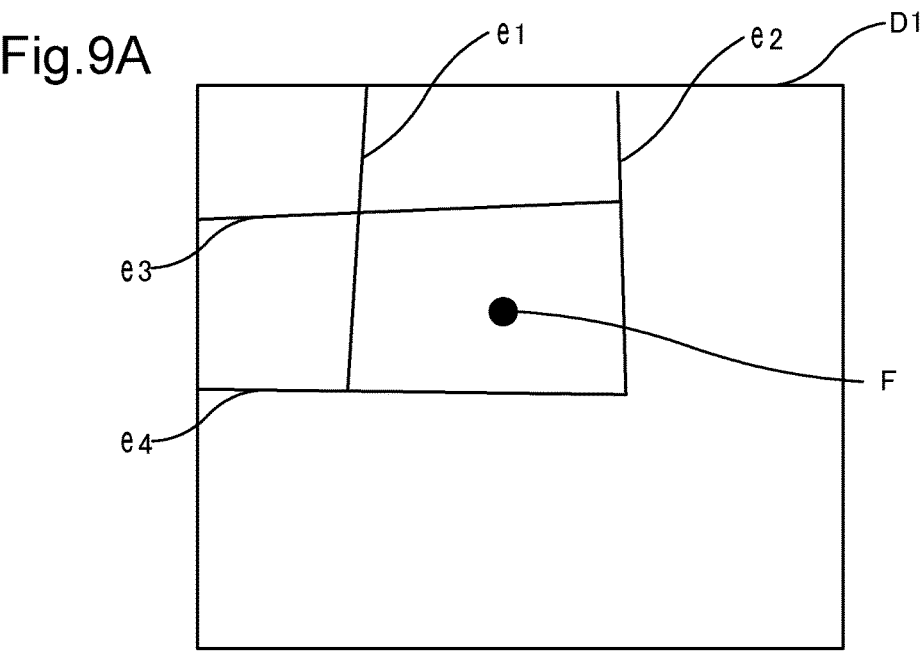
FIG. 9A and FIG. 9B are schematic drawings each showing an example of image data, a third edge line of which is detected by the image reading apparatus according to the embodiment 2.

In the example shown in FIG. 9A, four third edge lines e1, e2, e3, and e4 are detected in an image D1. For example, the third edge line e1 is the second edge line most distant from the center F toward the left side, and the third edge line e2 is the second edge line most distant from the center F toward the right side.

Figure 9B:
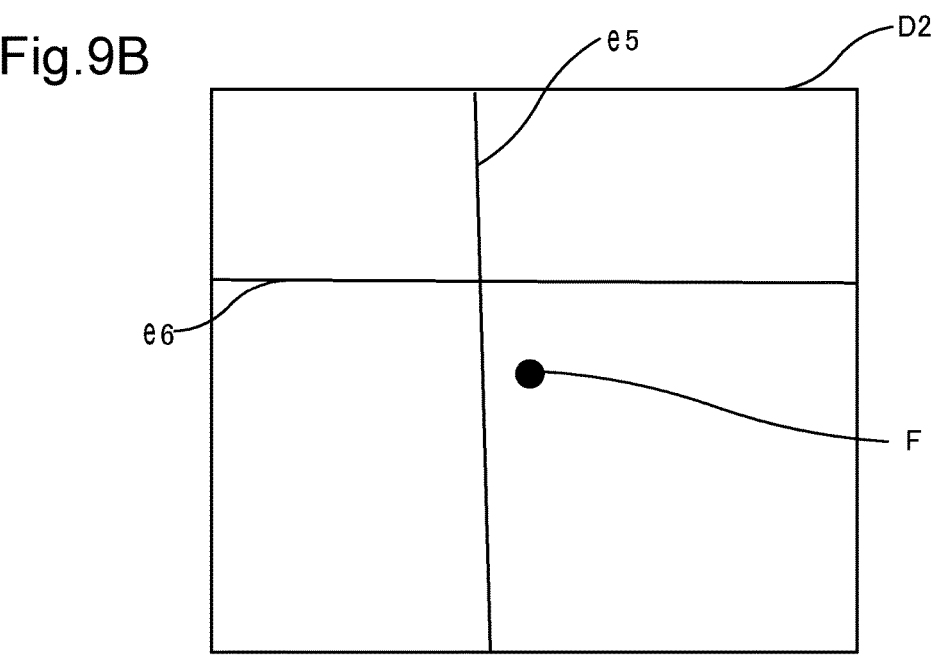

In the example shown in FIG. 9B, two third edge lines e5 and e6 are detected in an image D2. The third edge line e5 is the second edge line most distant from the center F toward the left side and the right side, and the third edge line e6 is the second edge line most distant from the center F toward the upper side and the lower side.

Back to FIG. 8, after step S25 the edge alignment decision unit 105 decides whether there is a crossing edge line intersecting another edge line in the third edge line, and whether the another edge line protrudes outwardly from the crossing edge line (step S26). When such another edge line protrudes outwardly from the crossing edge line, it can be assumed that the peripheral edge of the source document is located on a further outer side with respect to the crossing edge line.

Figure 10A:
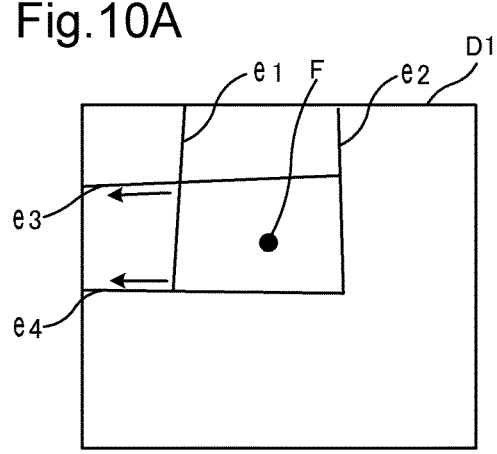
FIG. 10A to FIG. 10D are schematic drawings showing a process of deciding whether, when there is a crossing edge line intersecting another edge line, in the third edge line, the another edge line is on an outer side with respect to the crossing edge line, performed by the image reading apparatus according to the embodiment 2.

In the example shown in FIG. 10A, the third edge line e1 corresponds to the crossing edge line, and the third edge lines e3 and e4 intersecting the third edge line e1 correspond to the other edge lines. In this case, the third edge lines e3 and e4 protrude outwardly from the third edge line e1, in other words toward the left side of the image D1, as indicated by arrows in FIG. 10A, and therefore the edge alignment decision unit 105 decides that the other edge lines protrude outwardly from the crossing edge line.

Figure 10B:
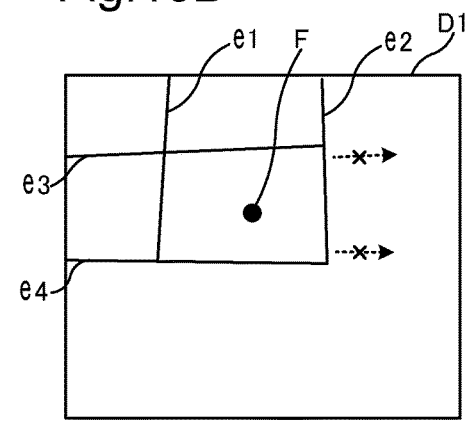

In the example shown in FIG. 10B, the third edge line e2 corresponds to the crossing edge line, and the third edge lines e3 and e4 intersecting the third edge line e2 correspond to the other edge lines. In this case, since the third edge lines e3 and e4 do not extend outwardly from the third edge line e2, in other words toward the right side of the image D1 as indicated by arrows in FIG. 10B, the edge alignment decision unit 105 decides that the other edge lines do not protrude outwardly from the crossing edge line.

Figure 10C:
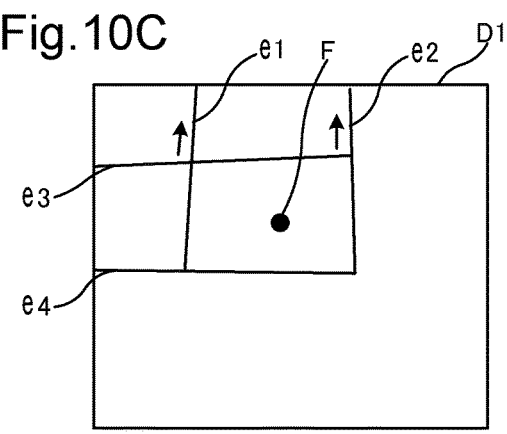
Figure 10D:
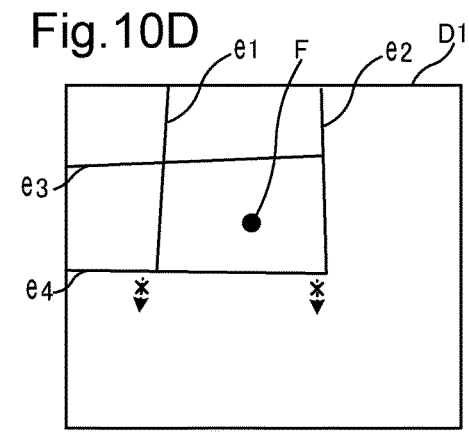

Likewise, in the case of FIG. 10C, the edge alignment decision unit 105 decides that the other edge lines (third edge lines e1 and e2) protrude outwardly from the crossing edge line (third edge line e3). In the case of FIG. 10D, the edge alignment decision unit 105 decides that the other edge lines (third edge lines e1 and e2) do not protrude outwardly from the crossing edge line (third edge line e4).

Back again to FIG. 8, upon deciding at step S26 that there is only one crossing edge line, from which the another edge line protrudes outwardly (YES at step S27), the edge alignment decision unit 105 decides that the source document is located along the edge of the reading range (step S29). More specifically, the edge alignment decision unit 105 decides that the source document is located along the edge, along the side to which the another edge line extends.

Upon deciding that there are two crossing edge lines, from which another edge line protrudes outwardly, and that the two crossing edge lines are orthogonal to each other (YES at step S28), the edge alignment decision unit 105 decides that the source document is located along the edge of the reading range (step S29). In this case, the edge alignment decision unit 105 decides that the source document is located along the edges, along the two sides to which the other edge lines extend.

In the cases other than the mentioned two cases, in other words in one of the cases (i) to (iii) cited below, the edge alignment decision unit 105 decides that the source document is not located along the edge of the reading range (step S31).

(i) There is no crossing edge line from which another edge line protrudes outwardly;

(ii) Although there are two crossing edge lines from which another edge line protrudes outwardly, the two crossing edge lines are not orthogonal to each other; and (iii) There are three or more crossing edge lines from which another edge line protrudes outwardly.

FIG. 11A to FIG. 11H each represent an example of the image in which the third edge lines are detected. In these drawings, D3 to D10 denote the image data in the respective examples, and e9 to e38 each denote the third edge line.

Figure 11A:
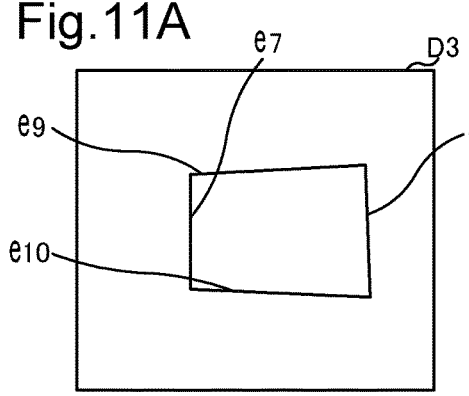
FIG. 11A to FIG. 11H are schematic drawings each showing an example of image data, the third edge line of which is detected by the image reading apparatus according to the embodiment 2.
Figure 11B:
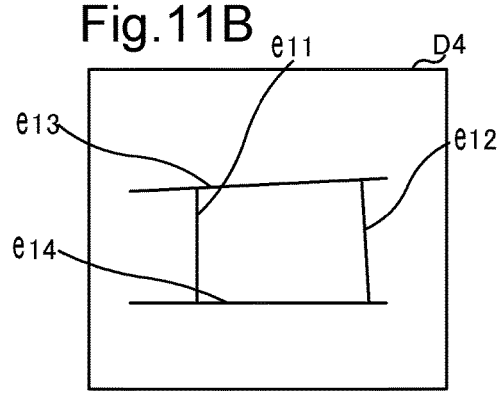
Figure 11C:
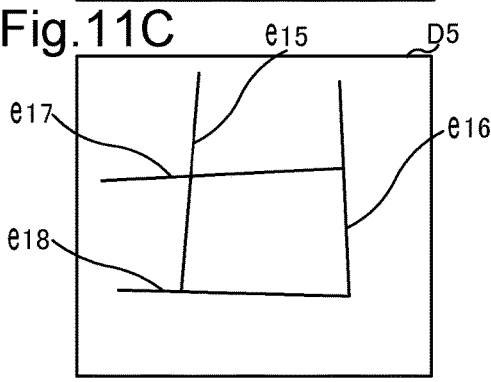
Figure 11D:
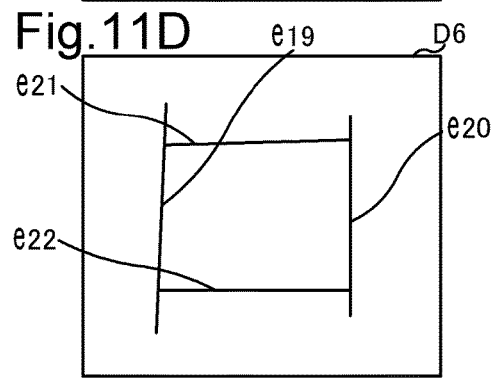
Figure 11E:
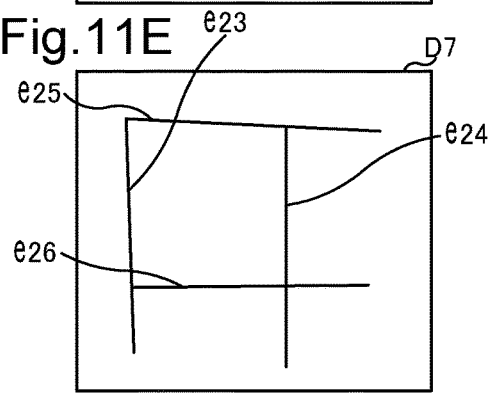
Figure 11F:
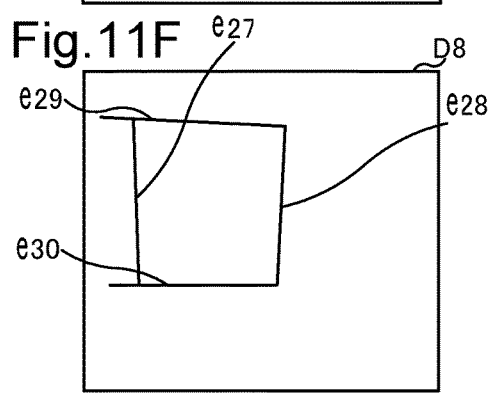
Figure 11G:
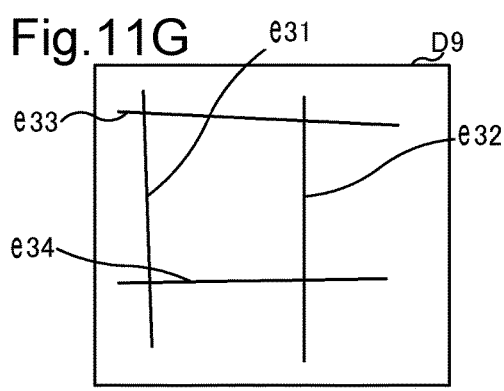
Figure 11H:
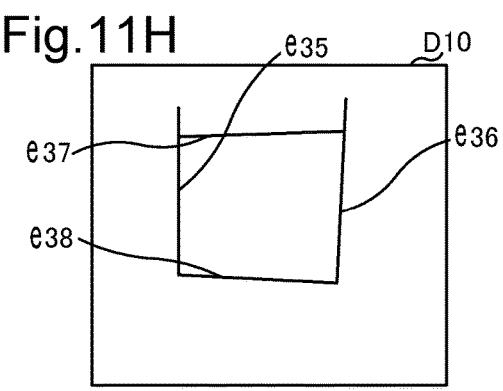

FIG. 11A corresponds to the case (i) above, FIG. 11B corresponds to the case (ii) above, FIG. 11C corresponds to the case where there are two crossing edge lines from which another edge line protrudes outwardly, and the two crossing edge lines are orthogonal to each other, and FIG. 11D corresponds to the case (ii) above. FIG. 11E corresponds to the case where there are two crossing edge lines from which another edge line protrudes outwardly, and the two crossing edge lines are orthogonal to each other, FIG. 11F corresponds to the case where there is only one crossing edge line from which another edge line protrudes outwardly, FIG. 11G corresponds to the case (iii) above, and FIG. 11H corresponds to the case (ii) above.

In the case (ii) above, in other words in the case shown in FIG. 11B and FIG. 11D, the edge alignment decision unit 105 decides that the source document is not located along the edge of the reading range, on the premise that the source document is not placed in contact with both of the opposing sides of the contact glass 161.

Back again to FIG. 8, after step S29 the document image clipping unit 81 determines as the region to be clipped out, the region surrounded by the third edge lines other than the crossing edge line, and the sides of the image located on the outer side with respect to the crossing edge line (step S30). In the example shown in FIG. 9A, the region surrounded by the third edge lines e2 and e4, and the upper side and the left side of the image D1, is determined as the region to be clipped out.

The document image clipping unit 81 further determines, after step S31, the region surrounded by the first edge line located on the outer side with respect to the third edge line (step S32). In the example shown in FIG. 11B, the first edge line closer to the left side of the image D4 than the third edge line e11 is, the first edge line closer to the right side of the image D4 than the third edge line e12 is, the first edge line closer to the upper side of the image D4 than the third edge line e13 is, and the first edge line closer to the lower side of the image D4 than the third edge line e14 is, are detected, and the region surrounded by the detected first edge lines is determined as the region to be clipped out.

After step S30 or step S32, the document image clipping unit 81 clips out the region determined at step S30 or step S32 from the image, and generates an object image (step S33).

Then the inclination correction unit 83 corrects the inclination of the object image generated at step S33 (step S34), and stores the object image that has undergone the inclination correction in the storage unit 4 (step S35).

As described above, the foregoing image reading apparatus is capable of accurately detecting the peripheral edge of the source document to be read, even when the source document is located along the edge of the predetermined reading range on the contact glass 161.

Embodiment 3

Figure 12:
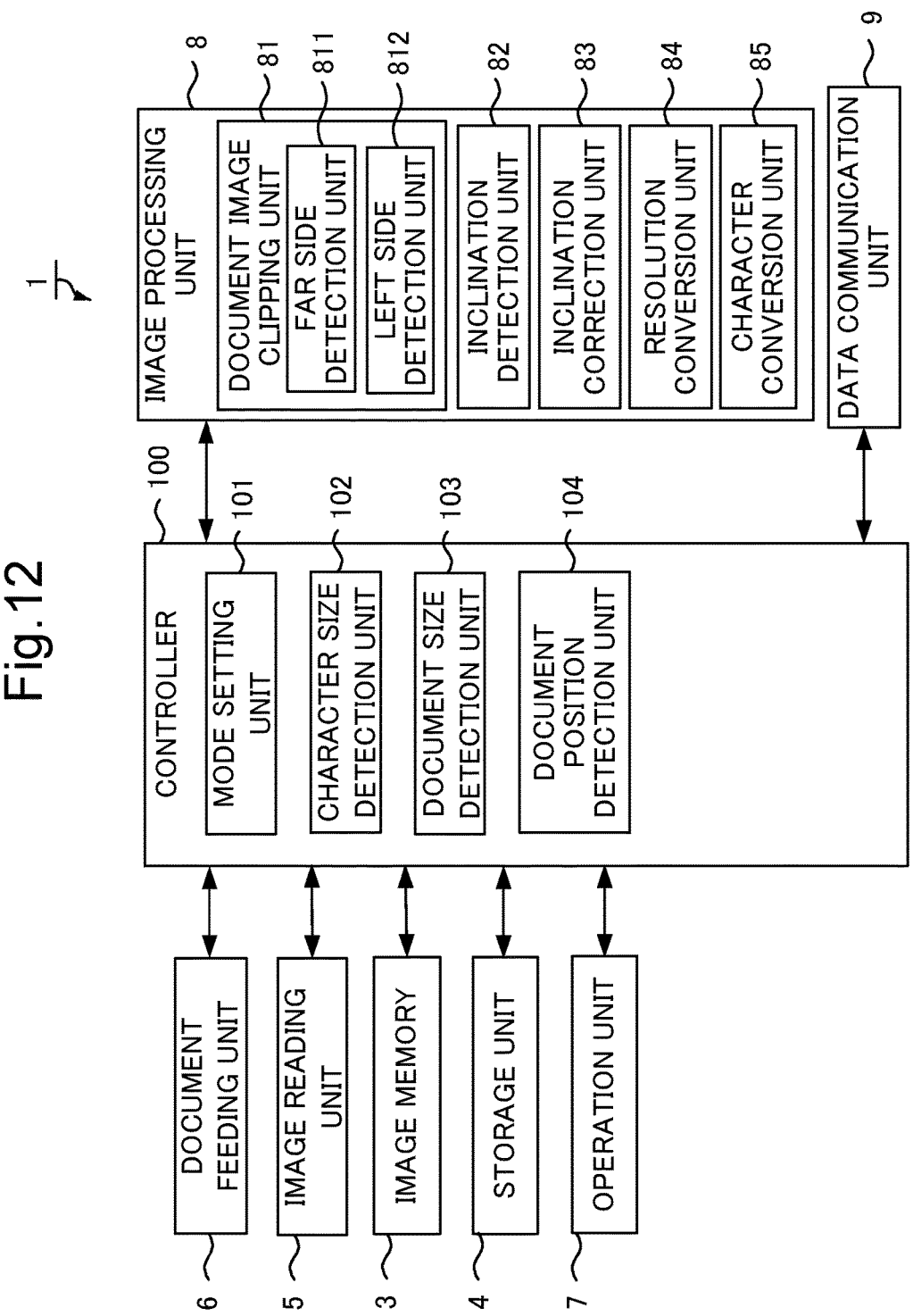
FIG. 12 is a functional block diagram showing an essential internal configuration of an image reading apparatus according to an embodiment 3.

FIG. 12 is a functional block diagram showing an essential internal configuration of an image reading apparatus according to an embodiment 3. The same elements as those of the image reading apparatus according to the embodiment 1 shown in FIG. 3 are given the same numeral, and the description thereof will not be repeated.

As shown in FIG. 12, the image reading apparatus according to the embodiment 3 includes a far side detection unit 811 and a left side detection unit 812, as additional elements of the document image clipping unit 81.

The document image clipping unit 81 detects a contact made by the source document with document guides 162L and 162B, and detects the region covered with the source document.

The far side detection unit 811 detects that the source document is in contact with the document guide 162B, on the basis of a reduced image subjected to resolution reduction by the resolution conversion unit 84, when a shadow of the document guide 162B (document guide shadow) is absent.

The left side detection unit 812 detects that the source document is in contact with the document guide 162L, on the basis of a reduced image subjected to resolution reduction by the resolution conversion unit 84, when there is a shadow along the left side of the contact glass 161.

Here, the document guide shadow and the shadow that appears along the left side of the contact glass 161 will be described hereunder.

Figure 13:
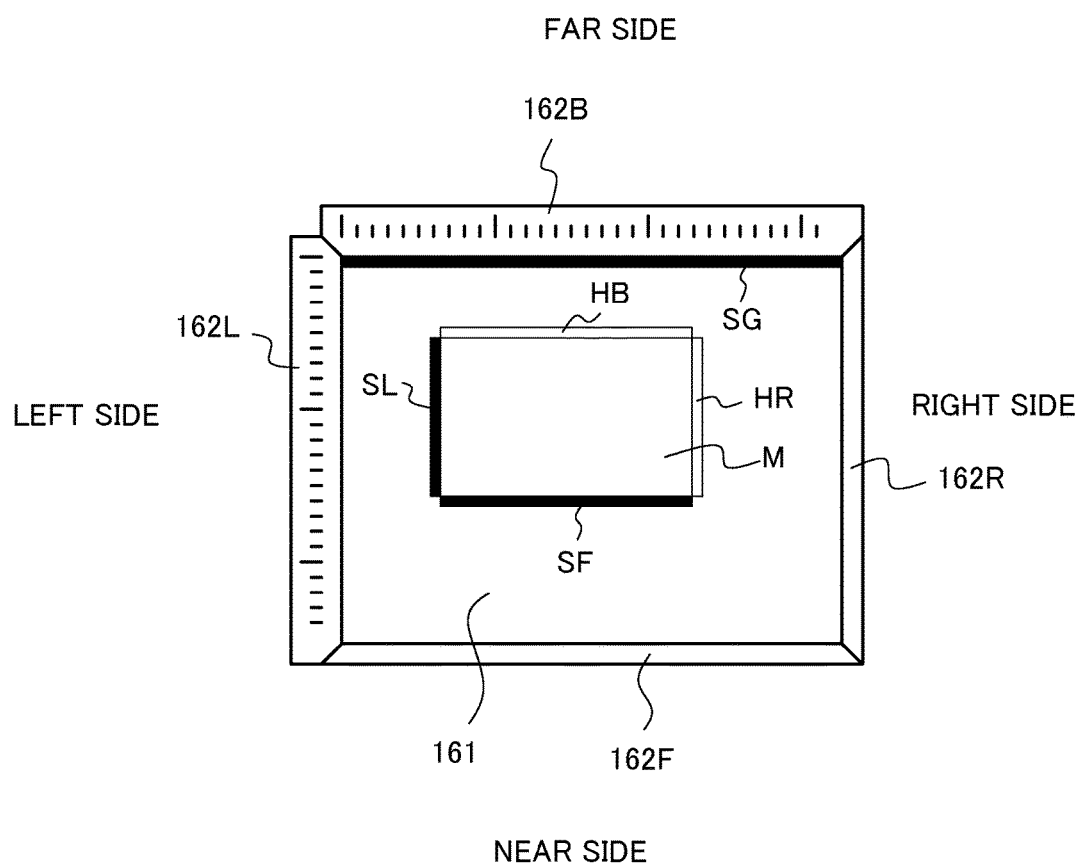
FIG. 13 is a schematic plan view showing the document table with a source document placed thereon, in the image reading apparatus according to an embodiment 3.

FIG. 13 illustrates the contact glass 161 with the source document M placed thereon. Around the source document M, document shadows SF and SL appear on the near side and the left side respectively, and halation regions HB and HR are created on the far side and the right side, respectively. The halation refers to a phenomenon that the light intensity increases along the source document M, such that the image turns to white. While the document shadows SF and SL are dark, the halation regions HB and HR are white.

In addition, the shadow of the document guide 162B (document guide shadow SG) appears along the far side of the contact glass 161.

Although the locations where the document shadows SF and SL, the halation regions HB and HR, and the document guide shadow SG appear vary depending on the configuration of the image reading apparatus 1 (in particular, position and orientation of the light source that illuminates the source document M), in this embodiment it will be assumed that the document shadows SF and SL appear on the near side (lower side in FIG. 13) and the left side of the source document M, the halation regions HB and HR appear on the far side (upper side in FIG. 13) and the right side of the source document M, and the document guide shadow SG appears on the far side of the contact glass 161 (upper side in FIG. 13). Hereinafter, the term "far side" refers to the upper side in FIG. 13, "near side" refers to the lower side in FIG. 13, "right side" refers to the right-hand side in FIG. 13, and the "left side" refers to the left-hand side in FIG. 13 (the same applies to FIG. 14A to FIG. 16B).

Figure 14A:
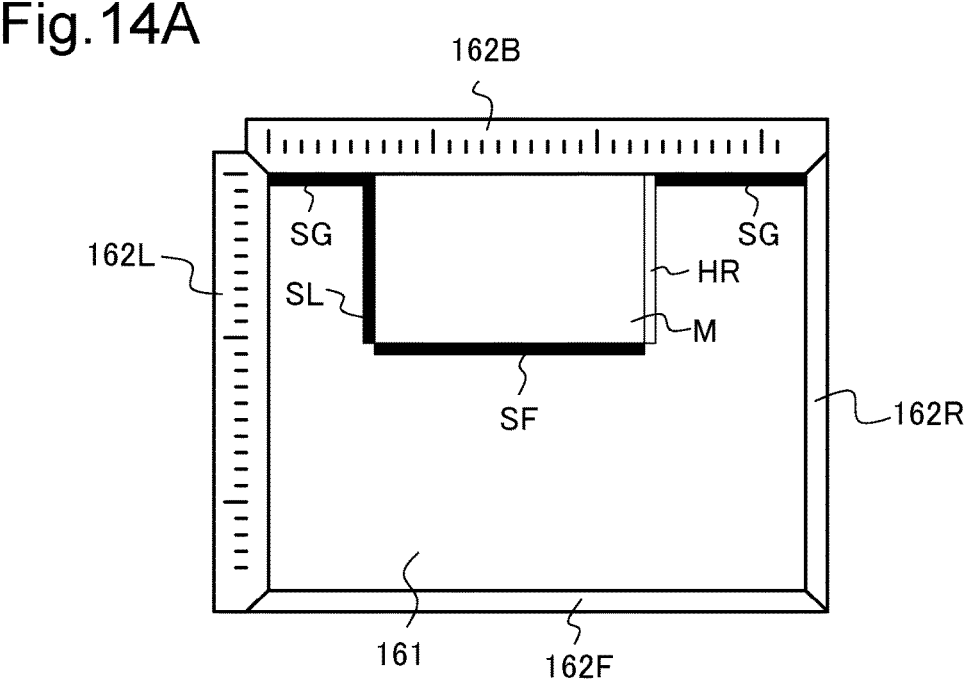
FIG. 14A is a schematic plan view showing a state where the source document is in contact with a far-side document guide.
Figure 14B:
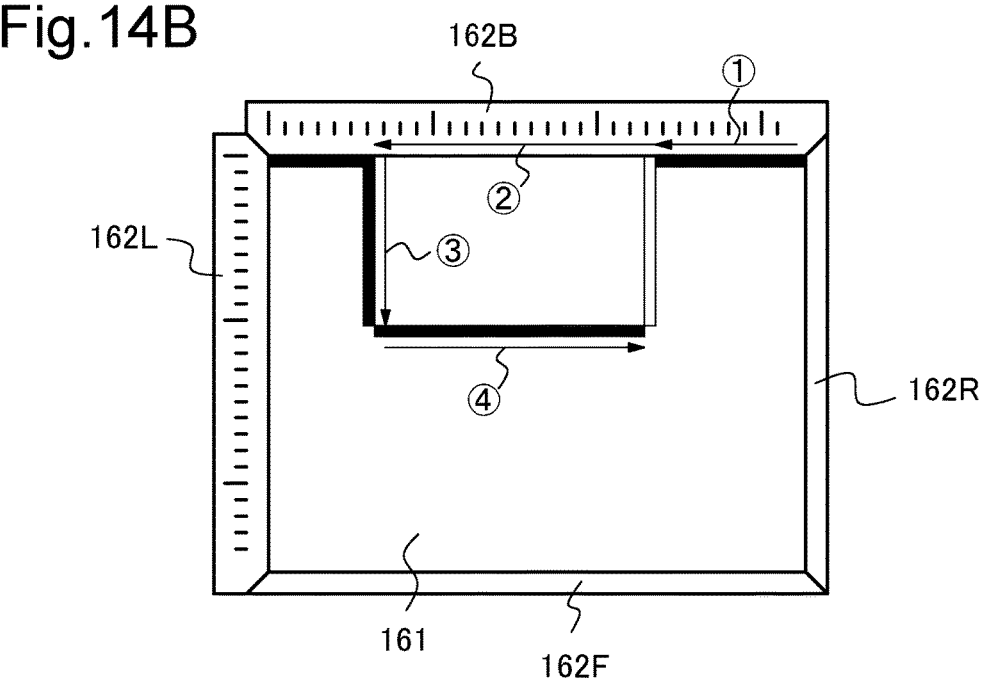
FIG. 14B is a schematic plan view for explaining a detection process of the region covered with the source document in the mentioned state.

FIG. 14A illustrates a state where the source document M is in contact with the far-side document guide 162B, and FIG. 14B is a schematic drawing for explaining the detection process of the region covered with the source document M, in the mentioned state. When the source document M is in contact with the document guide 162B, the document guide shadow SG does not appear along the interface with the source document M.

Thus, when the shadow is absent along the far side of the contact glass 161, where the document guide shadow SG is supposed to appear, it can be presumed that the source document M is in contact with the document guide 162B.

Referring to FIG. 14B, an example of the detection process of the region covered with the source document M will be described.

First step: The shadow is searched in a sub scanning direction (direction of arrow 1 in FIG. 14B) from the far right corner in FIG. 14B. When the disappearance of the shadow (document guide shadow SG) is detected, it is decided that the source document M is in contact with the document guide 162B, and the position where the shadow has disappeared is defined as the far right corner of the source document M.

Second step: The search of the shadow in the sub scanning direction is continued (direction of arrow 2 in FIG. 14B). When the appearance of the shadow (document guide shadow SG) is detected, the position where the shadow has appeared is defined as the far left corner of the source document M, and the distance along which the shadow is absent is presumed to be the length of the source document M in the sub scanning direction.

Third step: The shadow is searched in a main scanning direction from the far side toward the near side (direction of arrow 3 in FIG. 14B). When the disappearance of the shadow (document shadow SL) is detected, the position where the shadow has disappeared is defined as the near left corner of the source document M, and the length of the shadow is presumed to be the length of the source document M in the main scanning direction.

Fourth step: The shadow is searched in the sub scanning direction to the right (direction of arrow 4 in FIG. 14B). When the disappearance of the shadow (document shadow SF) is detected, the position where the shadow has disappeared is defined as the near right corner of the source document M, and the length of the shadow is presumed to be the length of the source document M in the sub scanning direction. Comparing the length of the source document M with the length presumed at the second step leads to improved detection accuracy.

Here, the expression "search the shadow" refers to detecting a predetermined image corresponding to the shadow in the image data (e.g., image composed of a predetermined number or more of pixels representing a black color, for example corresponding to 0 to 50 in the 256 gradations, aligned in the main scanning direction and the sub scanning direction). Here, the mentioned gradation number of the pixel is merely exemplary, and in no way intended for limitation.

Figure 15A:
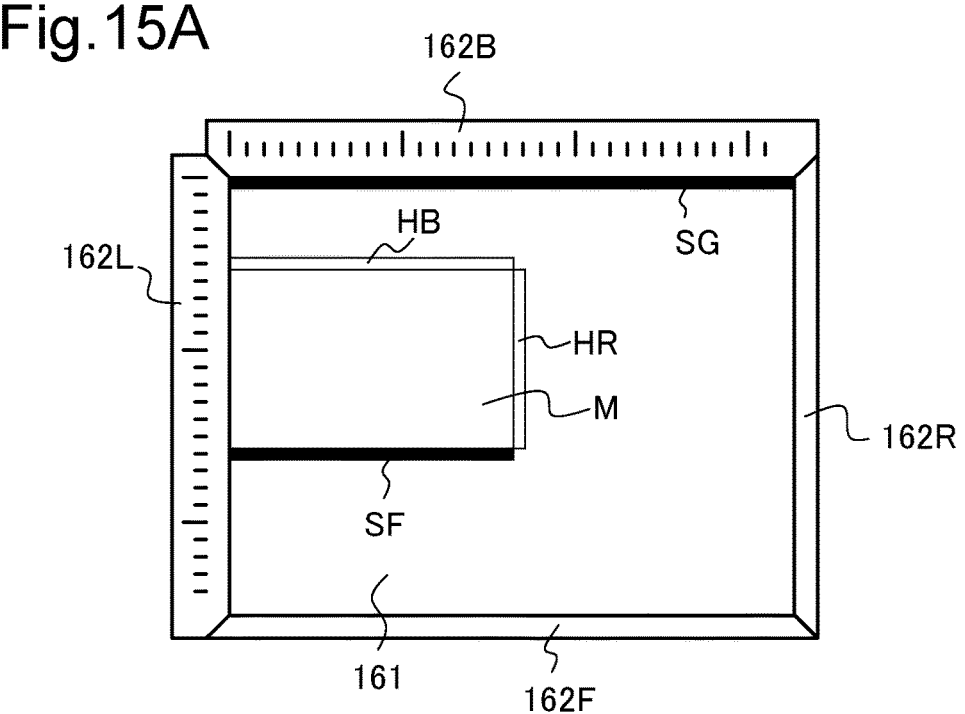
FIG. 15A is a schematic plan view showing a state where the source document is in contact with a left document guide.
Figure 15B:
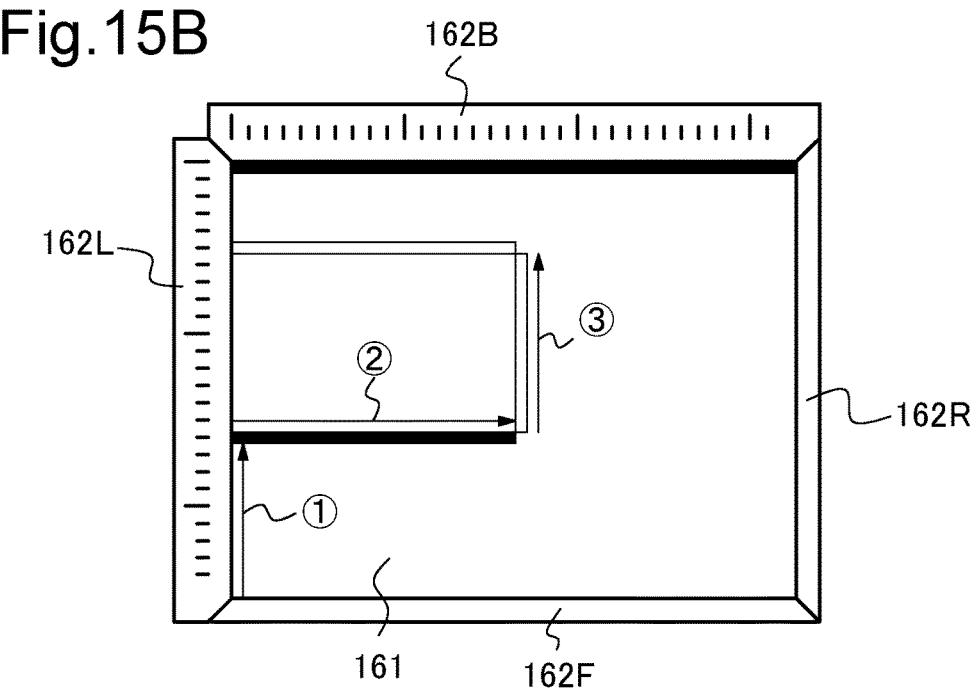
FIG. 15B is a schematic plan view for explaining a detection process of the region covered with the source document in the mentioned state.

FIG. 15A illustrates a state where the source document M is in contact with the left-side document guide 162L, and FIG. 15B is a schematic drawing for explaining the detection process of the region covered with the source document M, in the mentioned state. When the source document M is in contact with the document guide 162L, a shadow appears along the left side of the contact glass 161, owing to the shadow appearing around the source document (document shadow SF).

Thus, when the document shadow SL is absent along the left side of the contact glass 161, where the document shadow SL is supposed to appear, it can be presumed that the source document M is in contact with the document guide 162L.

Referring to FIG. 15B, an example of the detection process of the region covered with the source document M will be described.

First step: The shadow is searched in the main scanning direction from the near left corner in FIG. 15B. When the appearance of the shadow (document shadow SF) is detected, it is decided that the source document M is in contact with the document guide 162L, and the position where the shadow has appeared is defined as the near left corner of the source document M.

Second step: The shadow is searched in the sub scanning direction to the right. When the disappearance of the shadow (document shadow SF) is detected, the position where the shadow has disappeared is defined as the near right corner of the source document M, and the length of the shadow is presumed to be the length of the source document M in the sub scanning direction.

Third step: A white portion (halation region HR) is searched in the main scanning direction toward the far side. When the disappearance of the halation region HR is detected, the position where the halation region HR has disappeared is defined as the far right corner of the source document M, and the length of the halation region HR is presumed to be the length of the source document M in the main scanning direction.

Here, the expression "search the halation region HR" refers to detecting a predetermined image corresponding to the halation region HR in the image data (e.g., image composed of a predetermined number or more of the pixels representing a white color, for example corresponding to 240 to 255 in the 256 gradations, aligned in the main scanning direction and the sub scanning direction). Here, the mentioned gradation number of the pixel is merely exemplary, and in no way intended for limitation.

Figure 16A:
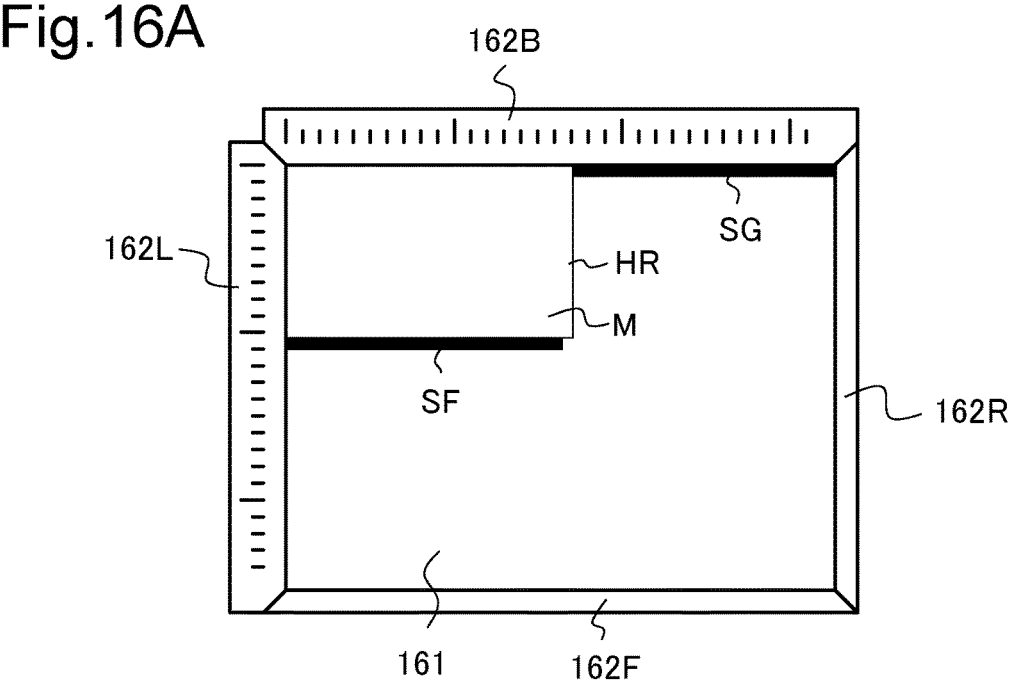
FIG. 16A is a schematic plan view showing a state where the source document is in contact with the left-side and far-side document guides.
Figure 16B:
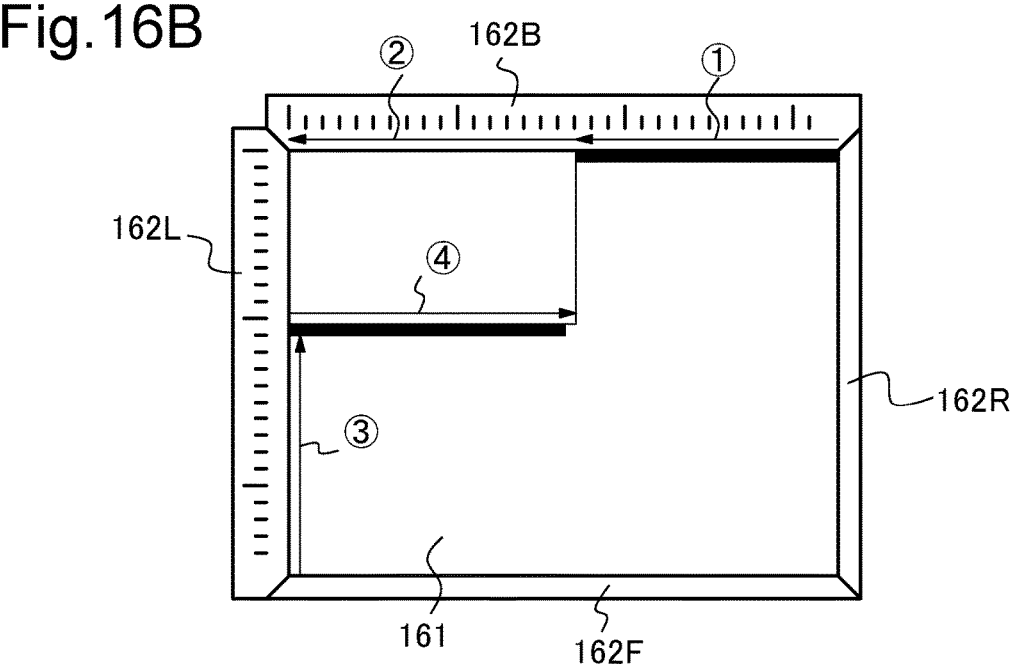
FIG. 16B is a schematic plan view for explaining a detection process of the region covered with the source document in the mentioned state.

FIG. 16A illustrates a state where the source document M is in contact with the left-side and far-side document guides 162L and 162B, and FIG. 16B is a schematic drawing for explaining the detection process of the region covered with the source document M, in the mentioned state. When the source document M is in contact with the document guides 162L and 162B, the document guide shadow SG does not appear along the left and far sides of the contact glass 161.

Referring to FIG. 16B, an example of the detection process of the region covered with the source document M will be described.

First step: The shadow is searched in the sub scanning direction from the far right corner in FIG. 16B. When the disappearance of the shadow (document guide shadow SG) is detected, it is decided that the source document M is in contact with the document guide 162B, and the position where the shadow has disappeared is defined as the far right corner of the source document M.

Second step: The search of the shadow in the sub scanning direction is continued. When the far left corner is reached without the shadow (document guide shadow SG) being detected, it is decided that the source document M is also in contact with the document guide 162L, and the far left corner of the contact glass 161 is defined as the far left corner of the source document M. Further, the distance along which the shadow is absent is presumed to be the length of the source document M in the sub scanning direction.

Third step: The shadow is searched in the main scanning direction from the near left corner. When the appearance of the shadow (document shadow SF) is detected, the position where the shadow has appeared is defined as the near left corner of the source document M, and the distance between the near left corner and the far left corner of the source document M is presumed to be the length of the source document M in the main scanning direction.

Fourth step: The shadow is searched in the sub scanning direction to the right. When the disappearance of the shadow (document shadow SF) is detected, the position where the shadow has disappeared is defined as the near right corner of the source document M, and the length of the shadow is presumed to be the length of the source document M in the sub scanning direction. Comparing the length of the source document M with the length presumed at the second step leads to improved detection accuracy.

Figure 17:
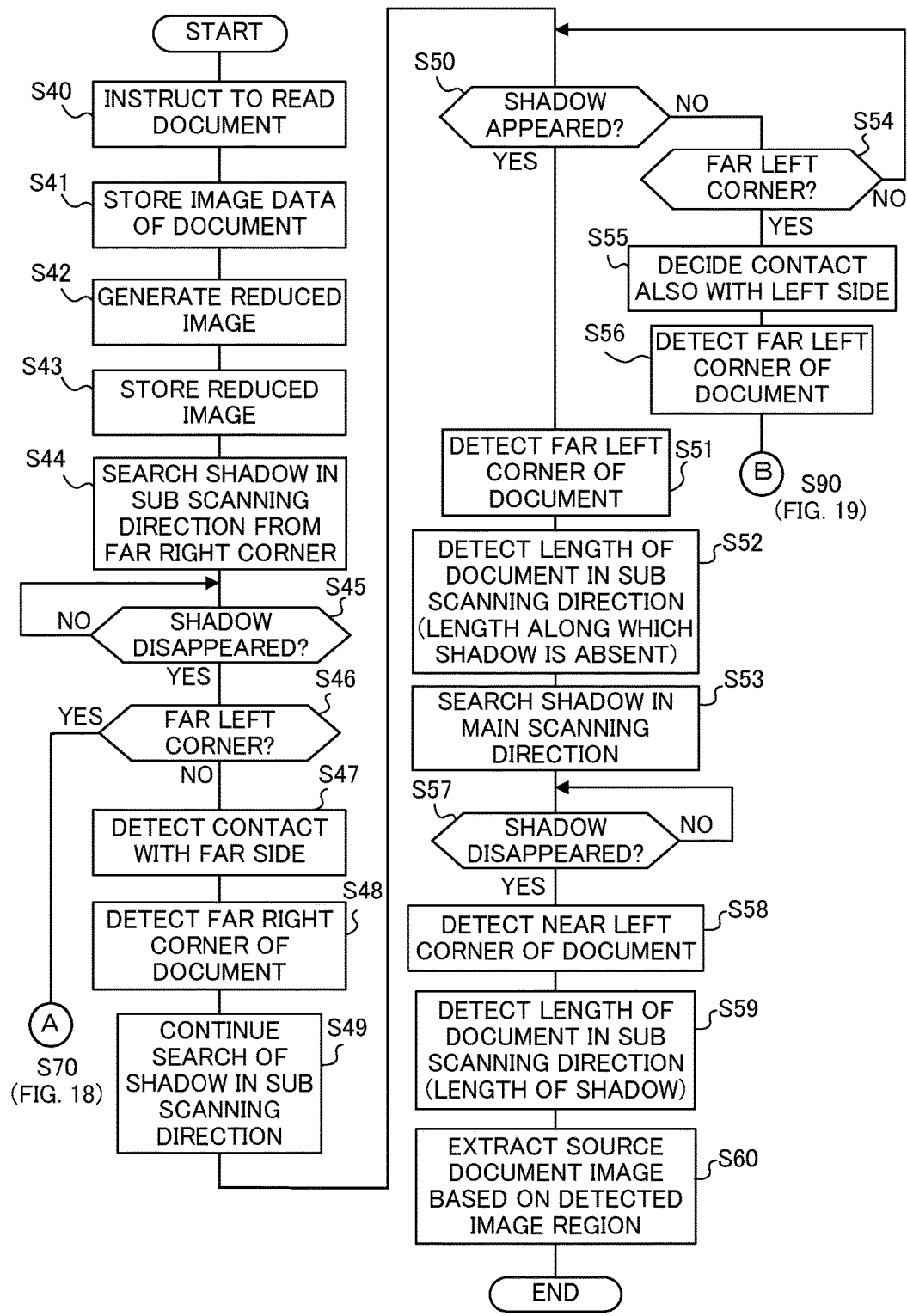
FIG. 17 is a flowchart showing an example of a process performed by a control unit of the image reading apparatus according to an embodiment 3.

Referring now to flowcharts shown in FIG. 17 to FIG. 19, examples of the operations performed by the controller 100 of the image reading apparatus 1 will be described hereunder. The following operations are performed when the image reading apparatus 1 reads the source document.

First, the controller 100 causes the image reading unit 5 to read the source document, with the document cover closed (step S40), and stores the image data acquired by the image reading unit 5 in the image memory 3 (step S41).

The resolution conversion unit 84 generates a reduced image of the source document from the image data acquired by the image reading unit 5 and stored in the image memory 3 (step S42), and stores the data of the reduced image in the storage unit 4 (step S43).

The far side detection unit 811 searches the shadow in the sub scanning direction from the far right corner in FIG. 13 to FIG. 16B, on the basis of the reduced image data stored in the storage unit 4 (the position and direction respectively corresponding to the far right corner and the sub scanning direction, in the storage region in the memory in which the reduced image data is stored, which also applies to the subsequent cases) (step S44), and decides whether the shadow (document guide shadow SG) has disappeared (step S45). Upon deciding that the shadow has disappeared (YES at step S45), the far side detection unit 811 decides whether the position where the shadow has disappeared is the far left corner (step S46).

In the case where the far side detection unit 811 decides that the position where the shadow has disappeared is not the far left corner (NO at step S46), the far side detection unit 811 decides that the source document M is in contact with the document guide 162B, and detects the position where the shadow has disappeared as the far right corner of the source document M. Then the far side detection unit 811 continues with the search of the shadow in the sub scanning direction (steps S47, S48, and S49).

In contrast, in the case where the far side detection unit 811 decides that the position where the shadow has disappeared is the far left corner (YES at step S46), the document guide shadow SG has not disappeared and hence the source document M is not in contact with the document guide 162B. Accordingly, the operation proceeds to step S70 (FIG. 18), where the left side detection unit 812 decides whether the source document M is in contact with the left-side document guide 162L.

Then the far side detection unit 811 decides whether the shadow has appeared (step S50), and upon deciding that the shadow (document guide shadow SG) has appeared (YES at step S50), the far side detection unit 811 detects the position where the shadow has appeared as the far left corner of the source document M (step S51). The far side detection unit 811 further calculates the length along which the shadow is absent, and detects the length obtained by the calculation as the length of the source document M in the sub scanning direction (step S52), after which the far side detection unit 811 searches the shadow in the main scanning direction, from the far side toward the near side (step S53).

In contrast, in the case where the far side detection unit 811 decides that the shadow has not appeared (NO at S50), the far side detection unit 811 decides whether the far left corner (far left corner of the contact glass 161) has been reached without the shadow having appeared (step S54). Upon deciding that the far left corner has been reached without the shadow having appeared (YES at step S54), the far side detection unit 811 decides that the source document M is in contact not only with the far side, but also with the left side document guide 162L, and detects the far left corner of the contact glass 161 as the far left corner of the source document M (steps S55 and S56), which is followed by step S90 (FIG. 19). In the case where the far side detection unit 811 decides that the far left corner has not been reached (NO at step S54), the operation returns to step S50.

The far side detection unit 811 then decides whether the shadow has disappeared (step S57). Upon deciding that the shadow (document shadow SL) has disappeared (YES at step S57), the far side detection unit 811 detects the position where the shadow has disappeared as the near left corner of the source document M (step S58). The far side detection unit 811 further calculates the length of the shadow, and detects the length obtained by the calculation as the length of the source document M in the main scanning direction (step S59).

Thereafter, the controller 100 extracts the image of the source document M from the image data stored in the image memory 3, according to the information indicating the region covered with the source document M detected by the far side detection unit 811 (step S60).

Figure 18:
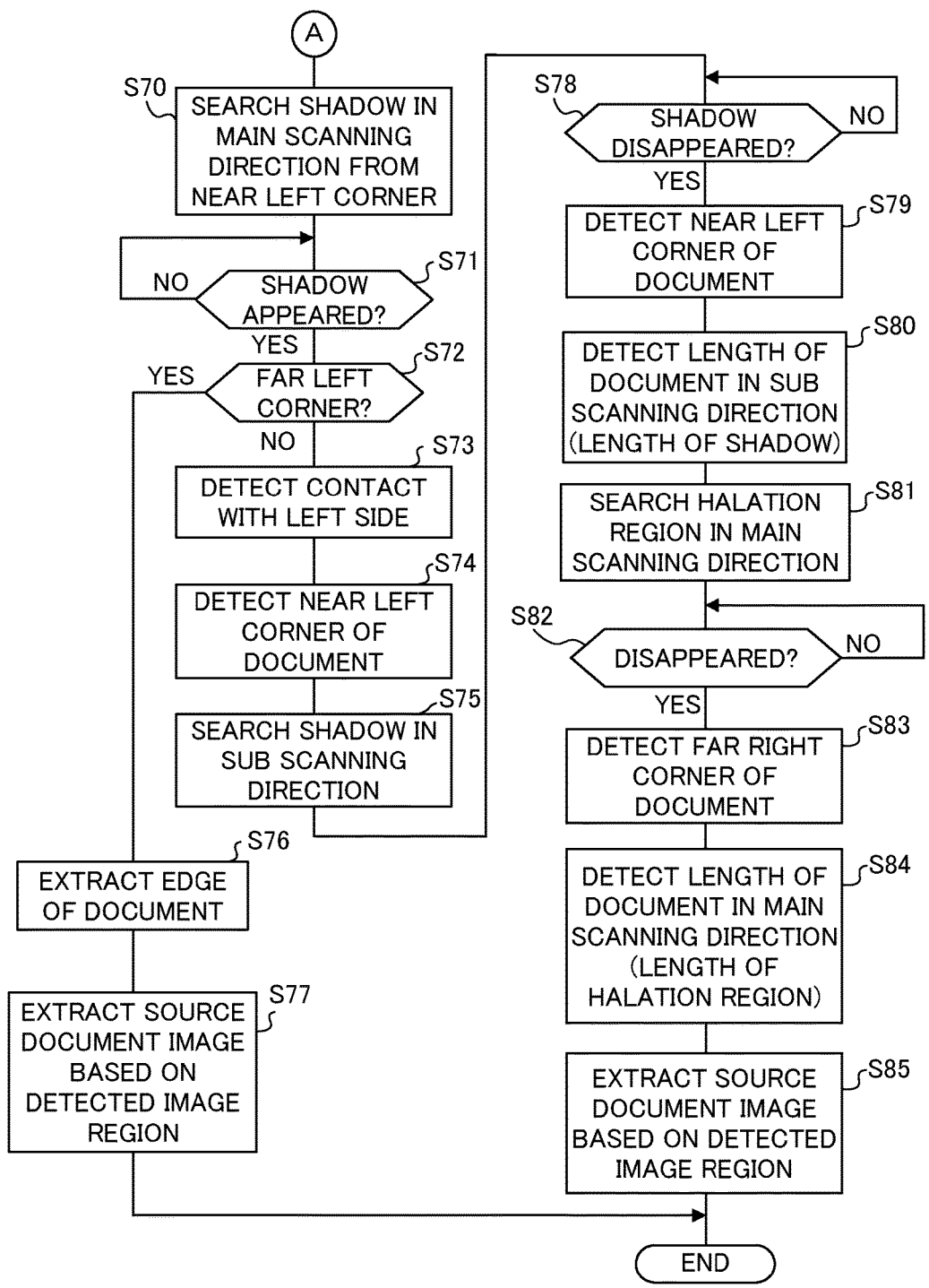
FIG. 18 is a flowchart showing another example of the process performed by a control unit of the image reading apparatus according to an embodiment 3.

At S70 shown in FIG. 18, the left side detection unit 812 searches the shadow in the main scanning direction from the near left corner, on the basis of the reduced image data stored in the storage unit 4 (step S70), and decides whether the shadow has appeared (step S71). Upon deciding that the shadow (document shadow SF or document guide shadow SG) has appeared (YES at step S71), the left side detection unit 812 decides whether the position where the shadow has appeared is the far left corner (step S72).

In the case where the left side detection unit 812 decides that the position where the shadow has appeared is not the far left corner (NO at step S72), the shadow that has appeared is the document shadow SF, and therefore the left side detection unit 812 decides that the source document M is in contact with the document guide 162L. The left side detection unit 812 also detects the position where the shadow (document shadow SF) has appeared as the near left corner of the source document M, and then searches the shadow in the sub scanning direction to the right (steps S73, S74, and S75).

In contrast, in the case where the left side detection unit 812 decides that the position where the shadow has appeared is the far left corner (YES at step S72), the shadow that has appeared is the document guide shadow SG, and hence the source document M is in contact with neither of the document guide 162L and the document guide 162B. Accordingly, the left side detection unit 812 assumes that the source document M is not in contact with any of the document guides 162F, 162L, 162B, and 162R, and the controller 100 extracts the edge of the source document M by a known method on the basis of the reduced image data stored in the storage unit 4, thereby detecting the region covered with the source document M (step S76). Further, the controller 100 extracts the image of the source document M from the image data stored in the image memory 3, according to the information indicating the detected region of the source document M (step S77). Here, in the case where the inclination of the source document M is detected, the controller 100 executes rotational correction of the source document image.

The left side detection unit 812 then decides whether the shadow has disappeared (step S78). Upon deciding that the shadow (document shadow SF) has disappeared (YES at step S78), the left side detection unit 812 detects the position where the shadow has disappeared as the near right corner of the source document M (step S79). The left side detection unit 812 further calculates the length of the shadow, and detects the length obtained by the calculation as the length of the source document M in the sub scanning direction (step S80), after which the left side detection unit 812 searches the halation region HR in the main scanning direction, toward the far side (step S81).

Then the left side detection unit 812 decides whether the halation region HR has disappeared (step S82). Upon deciding that the halation region HR has disappeared (YES at step S82), the left side detection unit 812 detects the position where the halation region HR has disappeared as the far right corner of the source document M (step S83). The left side detection unit 812 further calculates the length of the halation region HR, and detects the length obtained by the calculation as the length of the source document M in the main scanning direction (step S84).

Thereafter, the controller 100 extracts the image of the source document M from the image data stored in the image memory 3, according to the information indicating the region covered with the source document M detected by the left side detection unit 812 (step S85).

Figure 19:
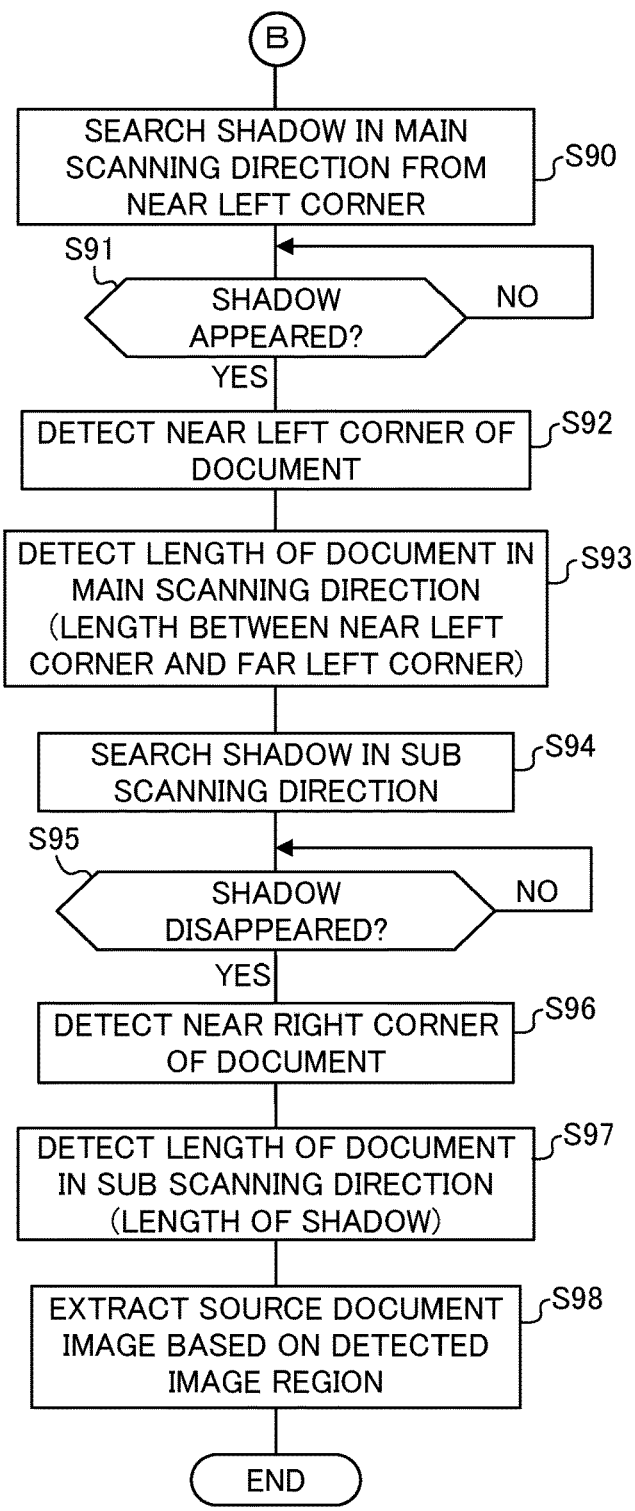
FIG. 19 is a flowchart showing still another example of the process performed by a control unit of the image reading apparatus according to an embodiment 3.

At S90 shown in FIG. 19, the left side detection unit 812 searches the shadow in the main scanning direction from the near left corner, on the basis of the reduced image data stored in the storage unit 4 (step S90).

The left side detection unit 812 then decides whether the shadow has appeared (step S91). Upon deciding that the shadow (document shadow SF) has appeared (YES at step S91), the left side detection unit 812 detects the position where the shadow has appeared as the near left corner of the source document M (step S92). The left side detection unit 812 further calculates the length between the near left corner and the far left corner (far left corner of the contact glass 161) of the source document M, and detects the length obtained by the calculation as the length of the source document M in the main scanning direction (step S93), after which the left side detection unit 812 searches the shadow in the sub scanning direction, to the right (step S94).

The left side detection unit 812 then decides whether the shadow has disappeared (step S95). Upon deciding that the shadow (document shadow SF) has disappeared (YES at step S95), the left side detection unit 812 detects the position where the shadow has disappeared as the near right corner of the source document M (step S96). The left side detection unit 812 further calculates the length of the shadow, and detects the length obtained by the calculation as the length of the source document M in the sub scanning direction (step S97).

Thereafter, the controller 100 detects the region indicated by the information detected by the far side detection unit 811 and the left side detection unit 812 as the region covered with the source document M, and extracts the image corresponding to the region covered with the source document M, from the image data stored in the image memory 3, according to the region covered with the source document M detected as above (step S98).

According to this embodiment, the contact of the source document M with the document guides 162B and 162L can be detected, depending on whether the document guide shadow SG, which is supposed to appear along the side of the contact glass 161, is absent, and whether the document shadow SF that appears around the source document M has appeared along the side of the contact glass 161. Accordingly, the edge of the source document M can be detected, even though the edge of the source document M fails to be directly extracted from the image data. Therefore, the region covered with the source document M can be properly detected, despite the source document M being in contact with the document guide 162B or 162L.

The present invention is not limited to the foregoing embodiments, but may be modified in various manners. Although the image reading apparatus according to the present invention is exemplified by the multifunction peripheral in the embodiments, the present invention is also applicable to different electronic apparatuses, for example other image reading apparatuses having a copying function, a printing function, a scanning function, or a facsimile function.

Further, the configurations and processing according to the foregoing embodiments, described above with reference to FIG. 1 to FIG. 19, are merely exemplary and in no way intended to limit the configurations and processing of the present invention.

What is claimed is:

1. An image reading apparatus comprising:
   a document table on which a source document is to be placed;
   an image reading unit that reads the source document placed on the document table in a predetermined resolution and acquires an image;
   a first resolution conversion unit that converts the resolution of the image acquired by the image reading unit into a first resolution for inclination detection lower than the predetermined resolution;
   an inclination detection unit that detects the inclination of an image of the source document contained in the image subjected to the resolution conversion by the first resolution conversion unit;
   an inclination correction unit that corrects the inclination of the image according to the inclination detected by the inclination detection unit;
   a document image clipping unit that clips out the image of the source document from the image;
   a second resolution conversion unit that converts the resolution of the image into a second resolution for generating a read image lower than the predetermined resolution and higher than the first resolution; and a mode setting unit that sets a quality-first mode or a speed-first mode, wherein, when the mode setting unit sets the quality-first mode, the document image clipping unit clips out, after the inclination correction unit corrects the inclination of the image acquired by the image reading unit in the predetermined resolution, according to the inclination detected by the inclination detection unit, the image of the source document from the image subjected to the inclination correction, and the second resolution conversion unit converts the resolution of the image of the source document into the second resolution, and when the mode setting unit sets the speed-first mode, the second resolution conversion unit converts, after the document image clipping unit clips out the image of the source document from the image acquired by the image reading unit in the predetermined resolution, the resolution of the image of the source document that has been clipped out into the second resolution, and the inclination correction unit corrects the inclination of the image of the source document subjected to the resolution conversion into the second resolution, according to the inclination detected by the inclination detection unit.

2. The image reading apparatus according to claim 1, further comprising:

a document size detection unit that detects a size of the source document from the image subjected to resolution conversion by the first resolution conversion unit; and a document position detection unit that detects a position of the source document, from the image subjected to the resolution conversion by the first resolution conversion unit.

3. The image reading apparatus according to claim 2, wherein the mode setting unit sets the speed-first mode when the image read by the image reading unit is equal to or larger than a predetermined size, and the mode setting unit sets the quality-first mode when the image read by the image reading unit is smaller than the predetermined size.

4. The image reading apparatus according to claim 1, further comprising a character conversion unit that recognizes a character contained in the image and converts the character into character data, wherein, when the character conversion unit is to convert the character contained in the source document image into the character data, the mode setting unit sets the quality-first mode.

5. The image reading apparatus according to claim 1, further comprising a character size detection unit that detects a size of a character contained in the source document image, wherein the mode setting unit sets the speed-first mode when the character contained in the source document image is equal to or larger than a predetermined size, and the mode setting unit sets the quality-first mode when the character contained in the source document image is smaller than the predetermined size.

6. The image reading apparatus according to claim 1, further comprising a mode reception unit through which a selection of the quality-first mode or the speed-first mode is inputted by a user, wherein the mode setting unit sets either mode according to the input received through the mode reception unit.

7. The image reading apparatus according to claim 1, further comprising an edge alignment decision unit that analyzes the image acquired by the image reading unit and decides whether the source document is located along an edge of a reading range, when the image reading unit is to read the source document, wherein the edge alignment decision unit (i) detects edge points in the image, and detects a succession of a predetermined number or more of the detected edge points as a first edge line; (ii) extracts, from the first edge line, a second edge line perpendicular or horizontal in the image of a rectangular shape; (iii) selects a third edge line closest to each of four sides defining the image of the rectangular shape, from the second edge line; (iv) decides, when one of the third edge lines intersects another of the third edge line, and the one intersecting edge line is defined as a crossing edge line, whether the another edge line protrudes from the crossing edge line toward a side defining the image closest to the crossing edge line; (v) decides that the source document is located along an edge of the reading range, when there is one crossing edge line from which the another edge line protrudes toward the side defining the image, or when there are two crossing edge lines from which the another edge line protrudes toward the side defining the image, and the two edge lines are orthogonal to each other; and (vi) decides that the source document is not located along an edge of the reading range, when there is no crossing edge line from which the another edge line protrudes toward the side defining the image, or when there are two crossing edge lines from which the another edge line protrudes toward the side defining the image, but the two edge lines are not orthogonal to each other, and the document image clipping unit (i) determines, when the edge alignment decision unit decides that the source document is located along an edge of the reading range, a region surrounded by the third edge line other than the crossing edge line and the side defining the image data closest to the crossing edge line, as a region to be clipped out from the image; and (ii) determines, when the edge alignment decision unit decides that the source document is not located along an edge of the reading range, a region surrounded by the first edge line closer than the third edge line to a side defining the image closest to the third edge line, as the region to be clipped out.

8. The image reading apparatus according to claim 7, wherein the edge alignment decision unit extracts the first edge line deviated from the line perpendicular or horizontal in the image of the rectangular shape, within a predetermined angle.

9. The image reading apparatus according to claim 1, further comprising a document guide located along a side of the document table, wherein the document image clipping unit determines a region to be clipped out from the image of the source document, on a basis of the image obtained through the reading of the image reading unit, by detecting an edge of the source document, according to an image representing a shadow that appears around the source document and an image representing halation that takes place around the source document, detecting a length of a side of the source document in a region where the image representing the shadow and the image representing the halation are absent, on a basis of a length of an image indicating that a shadow of the document guide, supposed to appear at a position in the image corresponding to the side of the document table, is absent, and detecting that the side of the source document is in contact with the document guide, when the image representing the shadow has reached a position corresponding to the side of the document table.

10. The image reading apparatus according to claim 9, wherein the document image clipping unit determines the region to be clipped out, on a basis of a reduced image subjected to resolution conversion by the first resolution conversion unit.

11. An image forming apparatus comprising:

the image reading apparatus according to claim 1; and an image forming unit that prints an image read by the image reading apparatus, on a sheet.

\* \* \* \* \*